United States Patent
Nader et al.

(10) Patent No.: US 11,936,460 B2
(45) Date of Patent: Mar. 19, 2024

(54) ANTENNA SELECTION FOR USER EQUIPMENT (UE) POWER SAVING DURING PDCCH MONITORING

(71) Applicant: Telefonaktiebolaget LM Ericsson (publ), Stockholm (SE)

(72) Inventors: Ali Nader, Malmö (SE); Andres Reial, Lomma (SE); Ilmiawan Shubhi, Malmö (SE); Pramod Jacob Mathecken, Lomma (SE); Sina Maleki, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 240 days.

(21) Appl. No.: 17/284,706

(22) PCT Filed: Oct. 30, 2019

(86) PCT No.: PCT/EP2019/079595
§ 371 (c)(1),
(2) Date: Apr. 12, 2021

(87) PCT Pub. No.: WO2020/089267
PCT Pub. Date: May 7, 2020

(65) Prior Publication Data
US 2021/0351837 A1  Nov. 11, 2021

Related U.S. Application Data

(60) Provisional application No. 62/754,135, filed on Nov. 1, 2018.

(51) Int. Cl.
*H04L 27/06* (2006.01)
*H04B 1/00* (2006.01)
*H04B 7/08* (2006.01)

(52) U.S. Cl.
CPC ................... *H04B 7/0834* (2013.01)

(58) Field of Classification Search
CPC .. H04B 7/0834; H04B 7/0602; H04B 7/0693; Y02D 30/70; H04W 52/028
(Continued)

(56) References Cited

U.S. PATENT DOCUMENTS 7,330,446 B2   2/2008  Lee et al.
9,892,752 B1   2/2018  Chu et al.
(Continued)

FOREIGN PATENT DOCUMENTS

EP        2625905 A1    8/2013
WO     2012047683 A1   4/2012

OTHER PUBLICATIONS

"3GPP TS 38.211 V15.6.0", 3rd Generation Partnership Project; Technical Specification Group Radio Access Network; NR; Physical channels and modulation (Release 15), Sep. 2019, pp. 1-97.
(Continued)

*Primary Examiner* — Tanmay K Shah
(74) *Attorney, Agent, or Firm* — Murphy, Bilak & Homiller, PLLC

(57) ABSTRACT

Exemplary embodiments include methods for receiving one or more physical downlink control channels (PDCCHs) using a selectable number of available antennas and receive chains. Embodiments can include receiving a configuration associated with one or more PDCCHs, wherein the configuration includes, for each PDCCH, a search space comprising a plurality of PDCCH candidate. Embodiments can include selecting a first number of antennas and receive chains for PDCCH reception, wherein the first number comprises the minimum number of the available antennas and receive chains needed to meet one or more PDCCH performance metrics. Embodiments can include selecting, for PDCCH
(Continued)

reception, either the first number of antennas and receive chains, or a greater second number of antennas and receive chains. Embodiments can include receiving the PDCCH using the selected number of antennas and receive chains. Other embodiments include UEs configured to perform operations corresponding to the exemplary methods.

25 Claims, 11 Drawing Sheets

(58) Field of Classification Search
USPC .......................................................... 375/316
See application file for complete search history.

(56) References Cited

U.S. PATENT DOCUMENTS

| | | | |
|---|---|---|---|
| 10,412,680 | B1 | 9/2019 | Hou et al. |
| 2003/0058821 | A1 | 3/2003 | Lee et al. |
| 2012/0134441 | A1* | 5/2012 | Yokomakura .......... H04B 7/063 |
| | | | 375/295 |
| 2017/0134148 | A1* | 5/2017 | Yerramalli ............. H04W 72/23 |
| 2017/0303278 | A1 | 10/2017 | Calin et al. |
| 2019/0124626 | A1* | 4/2019 | Bhattad ................ H04W 72/23 |
| 2019/0281555 | A1 | 9/2019 | Hou et al. |
| 2019/0357150 | A1* | 11/2019 | Wang .................. H04W 52/325 |

OTHER PUBLICATIONS

"3GPP TS 38.214 V15.6.0", 3rd Generation Partnership Project; Technical Specification Group Radio Access Network; NR; Physical layer procedures for data (Release 15), Jun. 2019, pp. 1-105.
"Adaptation aspects of NR UE power saving", 3GPP TSG-RAN WG1 Meeting #94bis; Tdoc R1-1811501; Chengdu, China, Oct. 8-12, 2018, pp. 1-4.
"Power consumption reduction based on time/frequency/antenna adaptation", 3GPP TSG RAN WG1 Meeting #94bis; R1-1810154; Chengdu, China, Oct. 8-12, 2018, pp. 1-5.
"UE Adaptation to the Traffic and UE Power Consumption Characteristics", 3GPP TSG-RAN WG1 Meeting #94bis; R1-1811282; Chengdu, China, Oct. 8-12, 2018, pp. 1-17.
"UE-assisted Approaches for UE Power Saving", 3GPP TSG-RAN WG1 Meeting #94bis; R1-1811128; Chengdu, China, Oct. 8-12, 2018, pp. 1-6.
"3GPP TS 38.211 V15.2.0", 3rd Generation Partnership Project; Technical Specification Group Radio Access Network; NR; Physical channels and modulation (Release 15), Jun. 2018, pp. 1-96.

"3GPP TS 38.214 V15.2.0", 3rd Generation Partnership Project; Technical Specification Group Radio Access Network; NR; Physical layer procedures for data (Release 15), Jun. 2018, pp. 1-94.
"3GPP TS 38.331 V15.2.1", 3rd Generation Partnership Project; Technical Specification Group Radio Access Network; NR; Radio Resource Control (RRC) protocol specification (Release 15), Jun. 2018, pp. 1-303.
"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.
Dahlman, Erik, et al., "Physical-Layer Control Signaling", 5G NR: The Next Generation Wireless Access Technology, Academic Press, 2018, pp. 184-197.
"3GPP TS 36.213 V15.7.0", 3rd Generation Partnership Project; Technical Specification Group Radio Access Network; Evolved Universal Terrestrial Radio Access (E-UTRA); Physical layer procedures (Release 15), Sep. 2019, pp. 1-551.
"Draft Agenda RAN1 94bis", 3GPP TSG RAN WG1 Meeting #94bis; R1-1810050; Chengdu, China, Oct. 8-12, 2018, pp. 1-8.
"New SID: Study on UE Power Saving in NR", 3GPP TSG RAN Meetings #80; RP-181463; La Jolla, USA, Jun. 11-14, 2018, pp. 1-5.
"3GPP TS 33.401 V15.9.0", 3rd Generation Partnership Project; Technical Specification Group Services and System Aspects; 3GPP System Architecture Evolution (SAE); Security architecture (Release 15), Sep. 2019, pp. 1-163.
"3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.
"Agreements up to RAN1#98bis on Multi-Beam1 (AI 7.2.8.3)", Oct. 29, 2019, pp. 1-9.
"Enhancements on multi-beam operations", 3GPP TSG RAN WG1 #99, R1-1912135, Reno, USA, Nov. 18-22, 2019, pp. 1-10.
"Enhancements to multi-beam operation", 3GPP TSG-RAN WG1 Meeting #97, Tdoc R1-1907436, Reno, USA, May 13-17, 2019, pp. 1-17.
"Summary of agreements for NR_eMIMO up to RAN1#98", 3GPP TSG RAN WG1 98bis, R1-1911730, Chongqing, China, Oct. 14-18, 2019, p. 1.
3GPP, "3rd Generation Partnership Project; Technical Specification Group Radio Access Network; NG-RAN; Architecture description (Release 15)", 3GPP TS 38.401 V15.6.0, Jul. 2019, pp. 1-46.
Unknown, "3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

ANTENNA SELECTION FOR USER EQUIPMENT (UE) POWER SAVING DURING PDCCH MONITORING

TECHNICAL FIELD

The present invention generally relates to wireless communication networks, and particularly relates to improvements to user equipment (UE) power.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third—("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Protocol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on Physical Uplink Shared Channel (PUSCH).

Uplink (i.e., UE to eNB) physical channels provided by the LTE PHY include PUSCH, Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 Res.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which may comprise four (4) REs.

FIG. 4 illustrates one exemplary manner in which the CCEs and REGs can be mapped to a physical resource, e.g., PRBs. As shown in FIG. 3B, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be determined based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1,2,3 or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

One of the solutions for low latency data transmission is shorter transmission time intervals. For NR, in addition to transmission in a slot (such as for LTE, discussed above), a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, or other services.

In Rel-15 NR, a UE can be configured with up to four carrier bandwidth parts (BWPs) in the downlink with a single downlink carrier BWP being active at a given time. A UE can be configured with up to four carrier BWPs in the uplink with a single uplink carrier BWP being active at a given time. If a UE is configured with a supplementary uplink, the UE can be configured with up to four additional carrier BWPs in the supplementary uplink, with a single supplementary uplink carrier BWP being active at a given time.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Resource blocks are defined and numbered in the frequency domain from 0 to $N_{BWP,i}^{size}-1$, where i is the index of the carrier BWP. Similar to LTE, each NR resource element (RE) corresponds to one OFDM subcarrier during one OFDM symbol interval. Various SCS values (referred to as numerologies) are supported in NR and are given by $\Delta f=(15\times 2^{\alpha})$ kHz where $\alpha \in (0,1,2,3,4)$. $\Delta f=15$ kHz is the basic (or reference) subcarrier spacing that is also used in LTE. The slot length is related to subcarrier spacing or numerology according to $\frac{1}{2^{\alpha}}$ ms. For example, there is one (1-ms) slot per subframe for $\Delta f=15$ kHz, two 0.5-ms slots per subframe for $\Delta f=30$ kHz, etc. Table 1 below lists the supported NR transmission numerologies, which can be configured by different higher-layer parameters for downlink and uplink.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

An NR slot can include 7 or 14 symbols for $\Delta f \leq 60$ kHz, and 14 symbols for $\Delta f>60$ kHz. FIG. 6A shows an exemplary NR slot configuration comprising 14 OFDM symbols, where the slot and symbols durations are denoted $T_s$ and $T_{symb}$, respectively. In addition, NR includes a Type-B scheduling, also known as "mini-slots." These are shorter than slots, typically ranging from 1-2 symbols up to one less than the number of symbols in a slot (e.g., 6 or 13), and can start at any symbol of a slot. Mini-slots can be used if the transmission duration of a slot is too long or the occurrence of the next slot start (slot alignment) is too late. Applications of mini-slots include, e.g., unlicensed spectrum and latency-critical transmission in which both mini-slot length and mini-slot frequency are important. FIG. 6B shows an exemplary two-symbol NR mini-slot.

Referring back to the earlier discussion about physical channels, in general, a UE determines its RB assignment in frequency domain for PUSCH or PDSCH using the resource allocation field in the detected DCI carried in PDCCH. In NR, two frequency resource allocation schemes, type 0 and type 1, are supported for PUSCH and PDSCH. The type to use for a PUSCH/PDSCH transmission can be defined by an RRC-configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall (upon detection of PDCCH intended for the UE) determine first the uplink/downlink carrier bandwidth part and then the resource allocation within the carrier bandwidth part.

In NR, DCI can be received over the PDCCH, which can carry DCI in messages with different formats. For example, DCI formats 0_0 and 0_1 are used to convey UL grants to the UE for transmission on PUSCH, while DCI formats 1_0 and 1_1 are used to convey DL grants for scheduled PDSCH transmissions. In a DL grant, a slot offset parameter (k0) indicates the number of slots between a PDCCH reception and the scheduled PDSCH reception. Other DCI formats (2_0, 2_1, 2_2 and 2_3) are used for other purposes including transmission of slot format information, reserved resource, transmit power control information, etc.

Similarly, in NR, UCI (Uplink Control Information) is carried by PUCCH. UCI can include, but is not necessarily limited to, HARQ (Hybrid Automatic Repeat Request) feedback, CSI (Channel State Information), and SR (Scheduling Request). Currently there are five different PUCCH formats (0-4) defined for carrying different types of UCI, where the sizes of the various formats range from one to 14 OFDM symbols. The various PUCCH formats are further defined in 3GPP TS 38.211.

Within an NR slot, the PDCCH channels are confined to a particular number of symbols in time and a certain number of subcarriers in frequency. In NR terminology, this control region is referred to as the control resource set (CORESET). A CORESET is made up of multiple RBs (i.e., multiples of 12 REs) in the frequency domain and either one, two, or three OFDM symbols in the time domain, as further defined in 3GPP TS 38.211 section 7.3.2.2. A CORESET is functionally similar to the control region in LTE subframe, such as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. Accordingly, an additional parameter is used to define the frequency domain region for NR. Frequency- and time-domain resources of a CORESET can be indicated to a UE by RRC signaling.

Even with the flexibility in configuring a PDCCH CORESET in NR, there are various issues, problems, and/or difficulties with UE power consumption when monitoring a PDCCH.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for receiving a physical downlink control channel (PDCCH) using a selectable number of available antennas and receive chains, according to various exemplary embodiments of the present disclosure. These exemplary methods and/or procedures can be performed by a user equipment (UE, e.g., wireless device, IoT device, modem, etc. or component thereof) in communication with a network node (e.g., base station, gNB, en-gNB, etc., or component thereof).

The exemplary methods and/or procedures can include receiving a configuration associated with one or more PDCCHs. The configuration can include, for each PDCCH, a search space comprising a plurality of PDCCH candidates. In some embodiments, the configuration can also include at least one slot offset between PDCCH transmission and a subsequent transmission of a physical downlink shared channel (PDSCH). In some embodiments, the received configuration can include a format of downlink control indicator (DCI) messages transmitted on the PDCCH. In some embodiments, the exemplary methods and/or procedures can also include sending a request for a PDCCH configuration that facilitates using a reduced number of antennas and receive chains for PDCCH reception. In such embodiments, the configuration can be received in response to this request.

The exemplary methods and/or procedures can also include selecting a first number of antennas and receive chains for PDCCH reception, wherein the first number comprises the minimum number of the available antennas and receive chains needed to meet one or more PDCCH performance metrics. In some embodiments, the first number can be one.

The exemplary methods and/or procedures can also include selecting one of the following to use for PDCCH reception: the first number of antennas and receive chains, and a greater second number of antennas and receive chains. In some embodiments, selecting one of the first number or the greater second number can be based on the at least one slot offset (e.g., received as part of the configuration). In some embodiments, the second number can be the minimum number of the available antennas and receive chains that are required to correctly decode the subsequent PDSCH transmission. In some embodiments, the second number can be the number of available antennas and receive chains.

In such embodiments, selecting one of the first and second numbers of antennas and receive chains can include determining whether the format of DCI messages can indicate at least one PDSCH transmission format that requires the second number of antennas and receive chains for correct decoding. In some embodiments, the at least one PDSCH transmission format comprises at least one of the following: a multi-layer PDSCH transmission; and a PDSCH transmission that uses additional frequency-domain resources than the PDCCH (e.g., different and/or additional BWPs).

In some embodiments, selecting one of the first and second numbers of antennas and receive chains can also include, if it is determined that the format of the DCI messages can indicate the at least one PDSCH transmission format, determining whether the minimum of the at least one slot offset is less than a predetermined duration. In some embodiments, the predetermined duration can be based on the time required to activate additional antennas and receive chains.

Furthermore, if it is determined that the minimum is less than the predetermined duration, the second number of antennas and receive chains can be selected. In some embodiments, selecting one of the first and second numbers of antennas and receive chains can also include, if it is determined that the slot offset is greater than or equal to the predetermined duration, selecting the first number of antennas and receive chains.

The exemplary methods and/or procedures can also include receiving the PDCCH using the selected number of antennas and receive chains. In some embodiments, the exemplary methods and/or procedures can also include receiving a downlink control indicator (DCI) message scheduling a PDSCH transmission at a first slot offset that was indicated in the configuration. In some embodiments, the exemplary methods and/or procedures can also include receiving the PDSCH transmission, at the first slot offset, using the second number of antennas and receive chains.

Other exemplary embodiments of the present disclosure include methods and/or procedures for configuring a user equipment (UE) to receive a physical downlink control channel (PDCCH) using a selectable number of available antennas and receive chains, according to various exemplary embodiments of the present disclosure. The exemplary method and/or procedure can be performed by a network node (e.g., base station, gNB, en-gNB, etc., or component thereof) in communication with a UE (e.g., wireless device, IoT device, modem, etc. or component thereof).

These exemplary methods and/or procedures can include selecting a PDCCH configuration including the following parameters, wherein at least one of the following is selected to facilitate the UE using a reduced number of antennas and receive chains for PDCCH reception: a search space comprising a plurality of PDCCH candidates; a downlink control indicator (DCI) format; and at least one slot offset between PDCCH transmission and a subsequent transmission of a physical downlink shared channel (PDSCH).

In some embodiments, the exemplary methods and/or procedures can also include receiving, from the UE, a request for a configuration that facilitates using a reduced number of antennas and receive chains for PDCCH reception. In such embodiments, the configuration can be selected in response to this request. In some embodiments, the request can identify a particular PDCCH configuration. In some embodiments, the request can identify one or more of the following: a search space configuration, a DCI format, PDCCH frequency resources, an aggregation level, and a slot offset between transmission of the PDCCH and a subsequent transmission of a PDSCH.

The exemplary methods and/or procedures can also include sending the configuration to the UE. The exemplary methods and/or procedures can also include subsequently transmitting, to the UE via the PDCCH, a downlink control indicator (DCI) message scheduling a PDSCH transmission, to the UE, at a slot offset that was indicated in the configuration. In some embodiments, the exemplary methods and/or procedures can also include transmitting the PDSCH, to the UE, at the slot offset that was indicated in the configuration.

Other exemplary embodiments include network nodes (e.g., radio base station(s), eNBs, gNBs, CU/DU, controllers, etc.) or user equipment (e.g., UE, wireless devices, IoT devices, or components thereof, such as a modem) configured to perform operations corresponding to various ones of the exemplary methods and/or procedures described above. Other exemplary embodiments include non-transitory, computer-readable media storing program instructions that, when executed by at least one processor, configure such network nodes or such UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1:
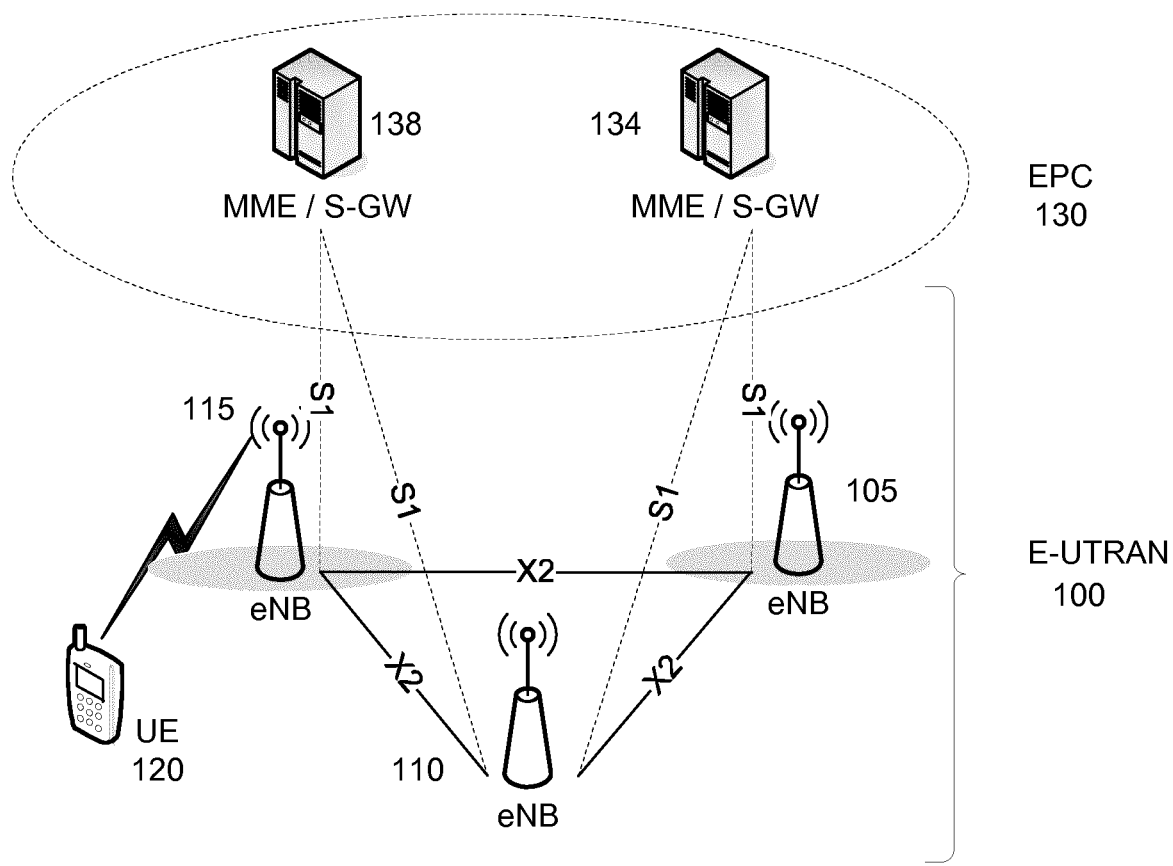
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
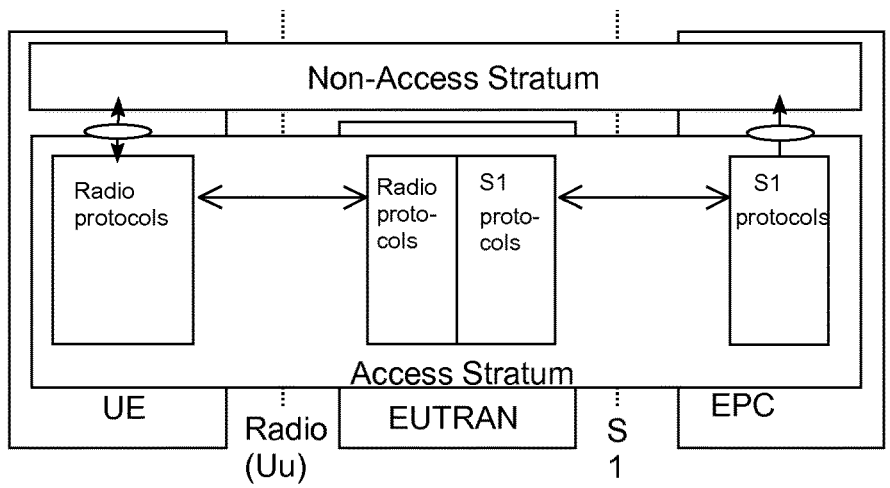
FIG. 2A is a high-level block diagram of an exemplary E-UTRAN architecture in terms of its constituent components, protocols, and interfaces.
Figure 2B:
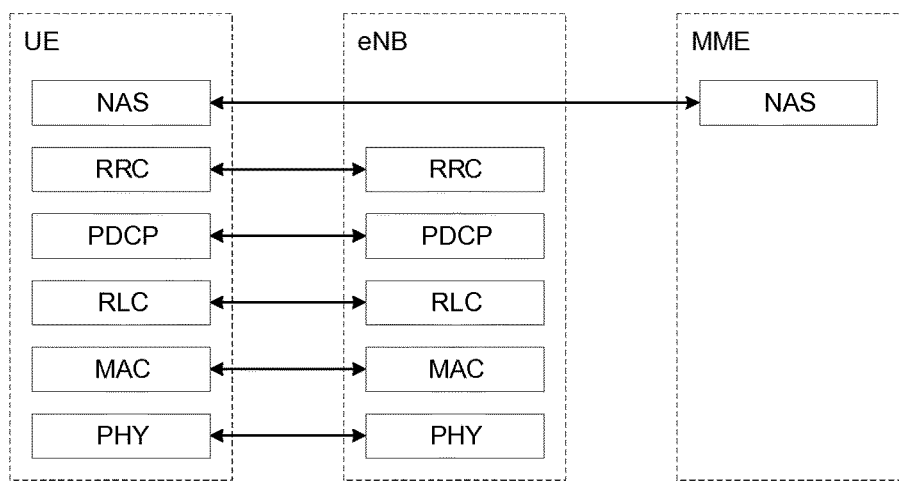
FIG. 2B is a block diagram of exemplary protocol layers of the control-plane portion of the radio (Uu) interface between a user equipment (UE) and the E-UTRAN.
Figure 2C:
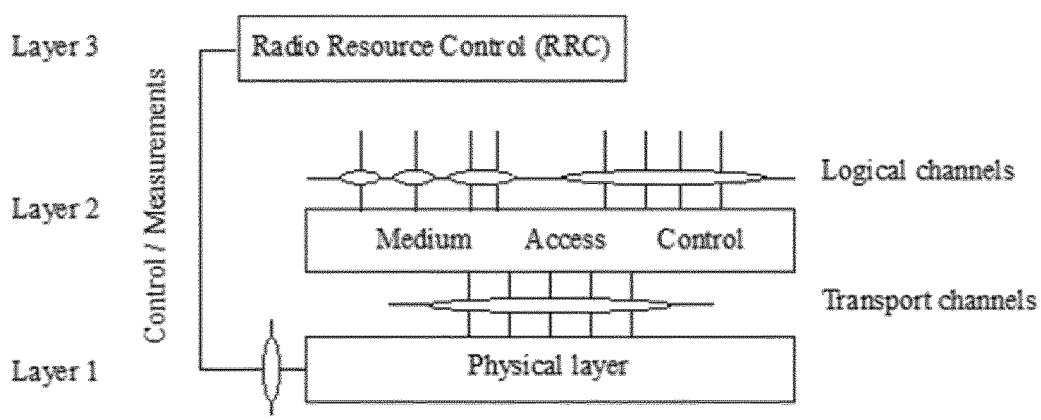
FIG. 2C is a block diagram of an exemplary LTE radio interface protocol architecture from the perspective of the PHY layer.
Figure 3A:
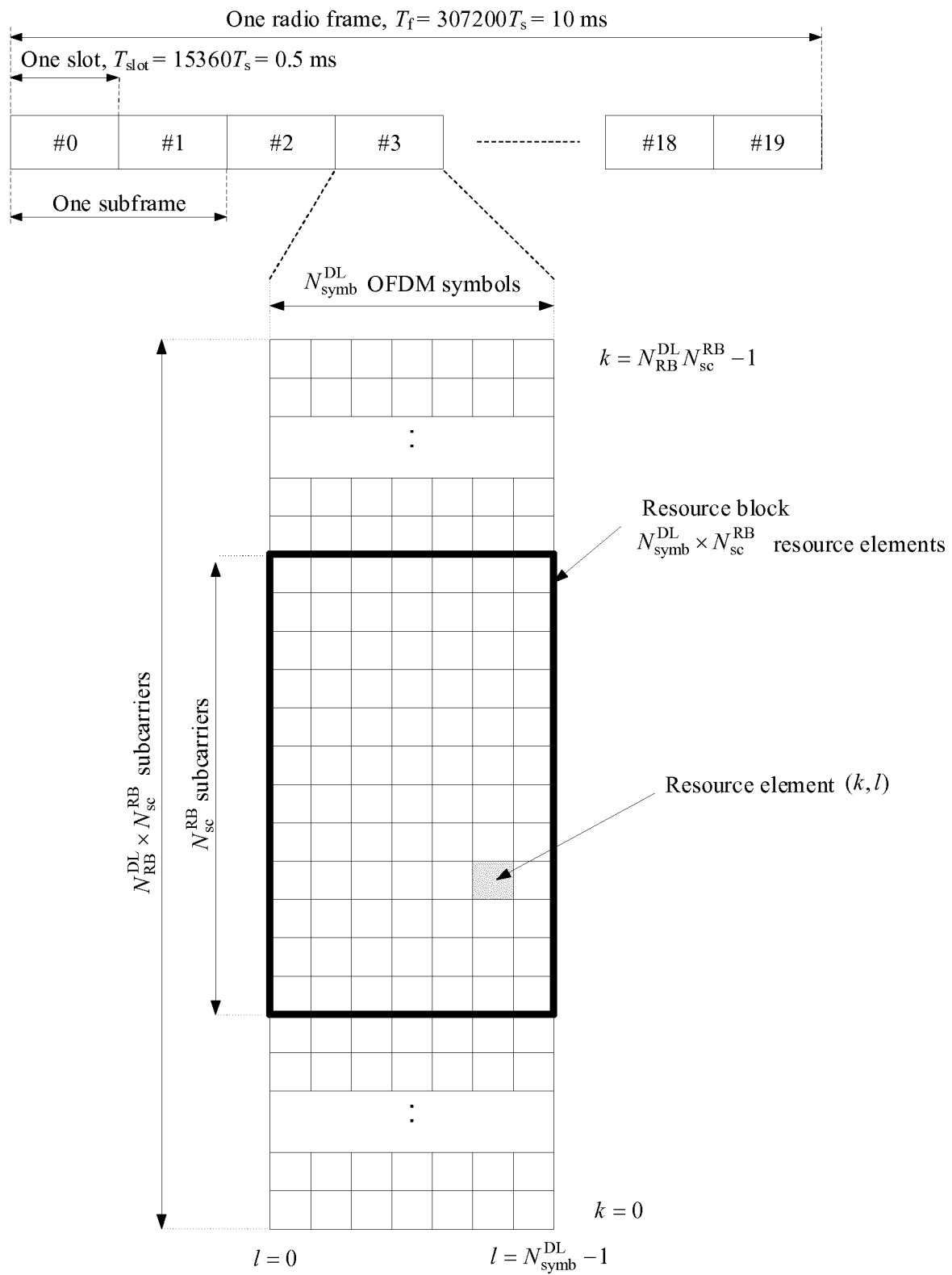
FIGS. 3A and 3B are block diagrams, respectively, of exemplary downlink and uplink LTE radio frame structures used for frequency division duplexing (FDD) operation.
Figure 3B:
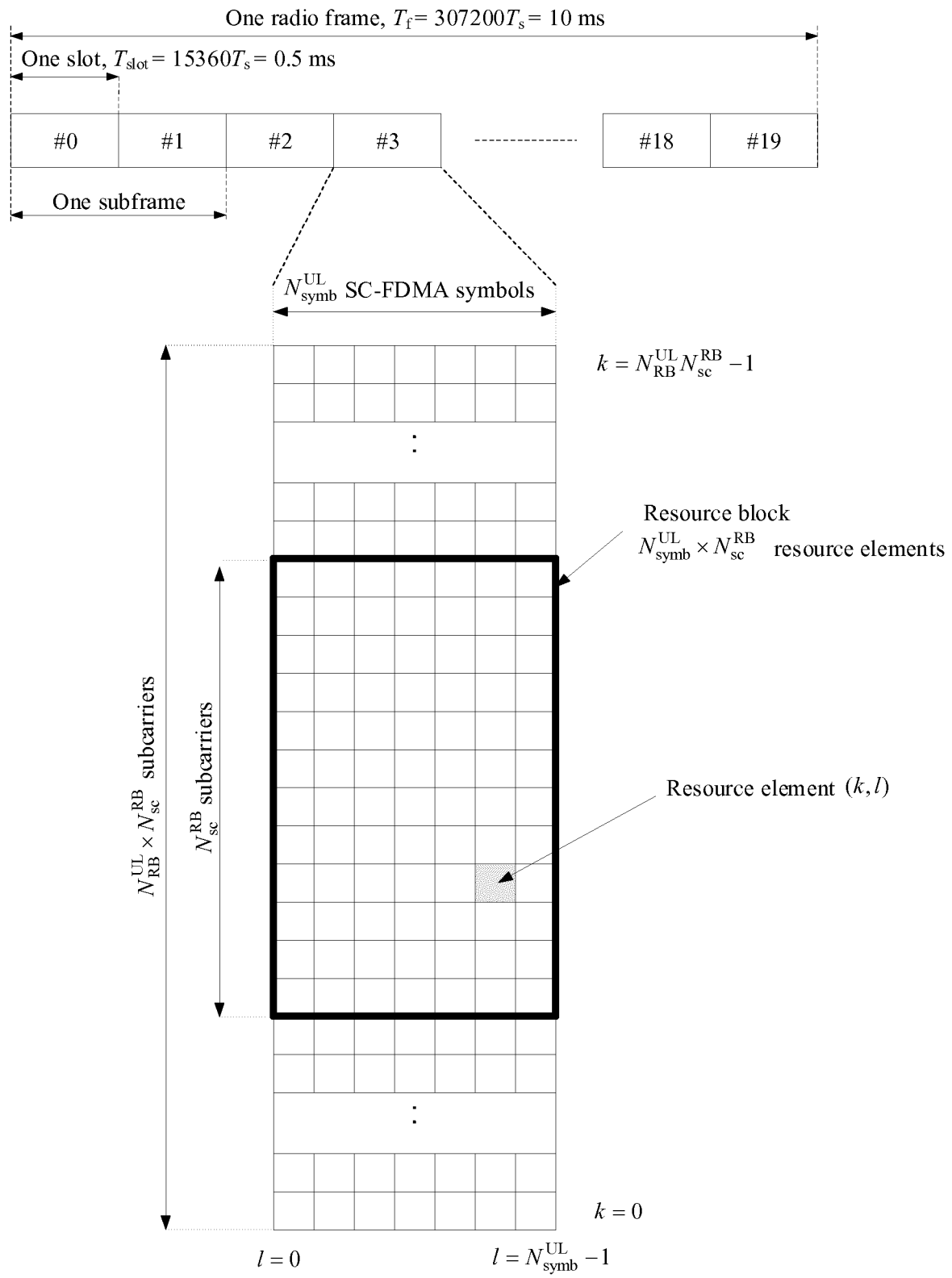
Figure 4:
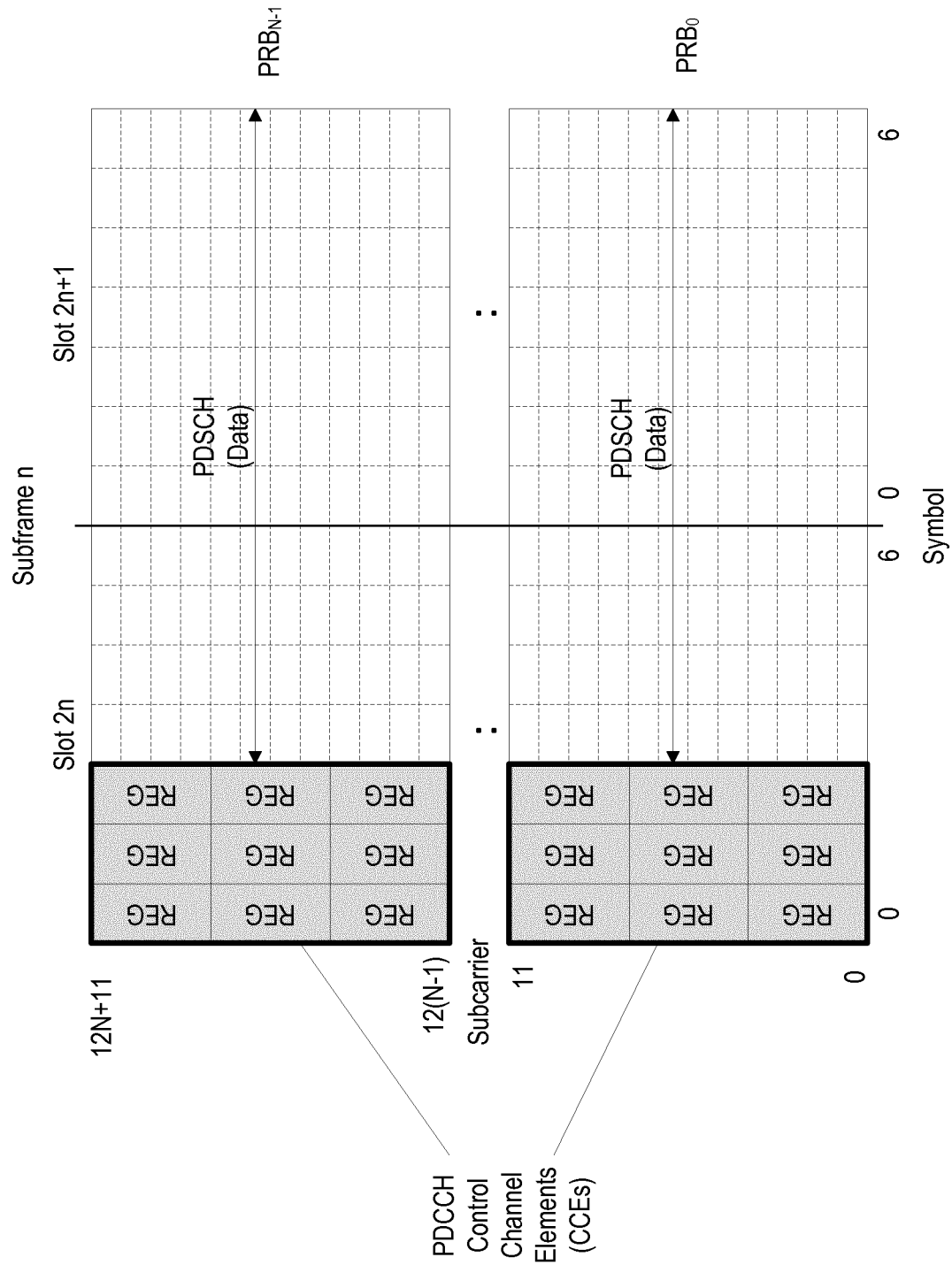
FIG. 4 shows an exemplary manner in which the CCEs and REGs can be mapped to a physical resource.

As briefly mentioned above, even with the flexibility in configuring a PDCCH CORESET in NR, there are various issues, problems, and/or difficulties with UE power consumption when monitoring a PDCCH. This is discussed in more detail below.

Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Briefly, MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. Each of the r symbols in s corresponds to a "layer," and r is referred to as the transmission "rank." In this way, spatial multiplexing is achieved since multiple symbols can be transmitted simultaneously over the same time/frequency resource element (TFRE). The number of symbols r is typically adapted to suit the current channel properties. To correctly receive an r-layer ("full rank") signal, a receiver must use at least r independent antenna elements.

Figure 7:
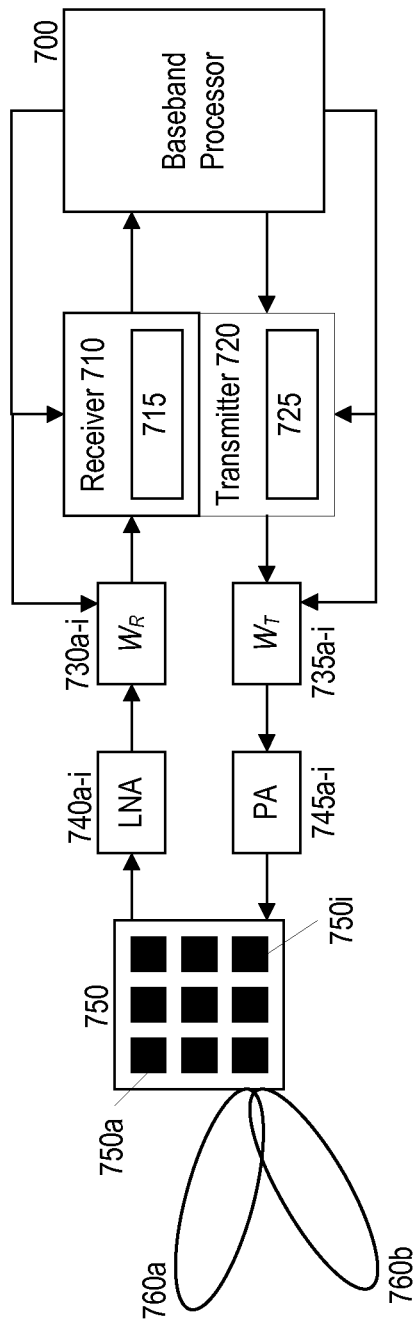
FIG. 7 shows a block diagram of an exemplary transceiver apparatus and/or device according to various exemplary embodiments of the present disclosure.

FIG. 7 shows a block diagram of an exemplary transceiver apparatus and/or device according to various exemplary embodiments of the present disclosure. For example, the exemplary transceiver apparatus can be a component of a UE or wireless device, including those described below in relation to other figures.

The exemplary apparatus shown in FIG. 7 can also include, e.g., an antenna array 750 that can comprise a plurality of individual antenna elements arranged in a particular pattern, such as, e.g., exemplary antenna elements 750a to 750i arranged in an exemplary 3-by-3 grid. In some exemplary embodiments, the antenna array 750 can be arranged as an M-by-N array of elements, where M≥1 and N>1. In some exemplary embodiments, the antenna elements 750a to 750i can be arranged in a rectangular grid with equal spacing in one or both dimensions; however, other exemplary arrangements of the elements comprising the array are possible and are within the scope of the present disclosure, including non-grid and/or irregular arrangements. In addition, each element of the antenna array 750 can have various physical forms including dipole, patch, cross dipole, inverted F, inverted L, helix, Yagi, rhombic, lens, and/or any another type of antenna topology known to persons of ordinary skill.

Elements 750a to 750i can utilize various polarization patterns known to persons of ordinary skill, including horizontal, vertical, circular, and cross polarization. For example, elements 750a to 750i—as well as their arrangement in the array 750—can be designed and/or configured especially for the particular operating frequency (e.g., 5 GHz, 10 GHz, 300 GHz, etc.) and device (e.g., mobile or fixed-location terminal, cellular phone, handset, laptop, tablet, etc.) in which the exemplary apparatus of FIG. 7 can be used.

According to certain exemplary embodiments of the present disclosure, the antenna elements 750a to 750i can be used for receiving and/or transmitting signals in combination with, respectively, other receiving and transmitting circuitry comprising the exemplary apparatus. The receiving circuitry can comprise a plurality of low-noise amplifiers (LNAs) 740a through 740i, each of which can amplify a signal received from a corresponding antenna element 750a through 750i. The exemplary apparatus can further comprise a plurality of receive gain/phase controls 730a through 730i, each of which can receive a signal output from a corresponding (LNAs) 740a through 740i. In some exemplary embodiments, the receive gain/phase control 730 can comprise a receiver beamformer that can be controlled by, e.g., one or more processors 700. The outputs of the receive gain/phase controls 730a through 730i are provided to a receiver block 710, which can comprise a receive conversion circuit 715. The inputs to block 710 can be at a particular radio frequency (RF), in which case block 710 can comprise circuitry configurable to translate the signals to an intermediate frequency (IF). Nevertheless, the skilled person can readily comprehend that RF-to-IF conversion can alternately occur prior to the signals reaching receiver block 710. As indicated herein, references to "processor" should be understood to mean one or more processors, including one or more computer processors, signal processors, etc.

The output of circuit 715 can comprise one or more streams of digitized samples that are provided to a baseband processor 700, which can provide one or more receiver control signals for controlling various operational aspects of, e.g., receive gain/phase controls 730a through 730i, receive conversion circuit 715, etc. Similarly, processor 700 can provide one or more streams of digitized samples to transmitter block 720, which can comprise a transmit conversion block 725. The output of block 720 (e.g., the output of transmit conversion block 725) can comprise a plurality of analog signals, each of which can be at RF or IF, as described above for the receiving circuitry. Each of the analog signals output by transmitter block 720 can be applied to a corresponding transmit gain/phase control 735a through 735i. Processor 700 can also provide one or more transmitter control signals for controlling various operational aspects of, e.g., transmit gain/phase controls 735a through 735i, transmit conversion block 725, etc. In some exemplary embodiments, transmit gain/phase control 735 can comprise a transmit beamformer that can be controlled by, e.g., processor 700. Each of the signals output by transmit gain/phase control 735a through 735i can be applied to a corresponding transmit power amplifier (PA) 745a through 745i. The amplified outputs of the PAs can be applied to respective corresponding antenna array elements 750a through 750i.

Figure 5:
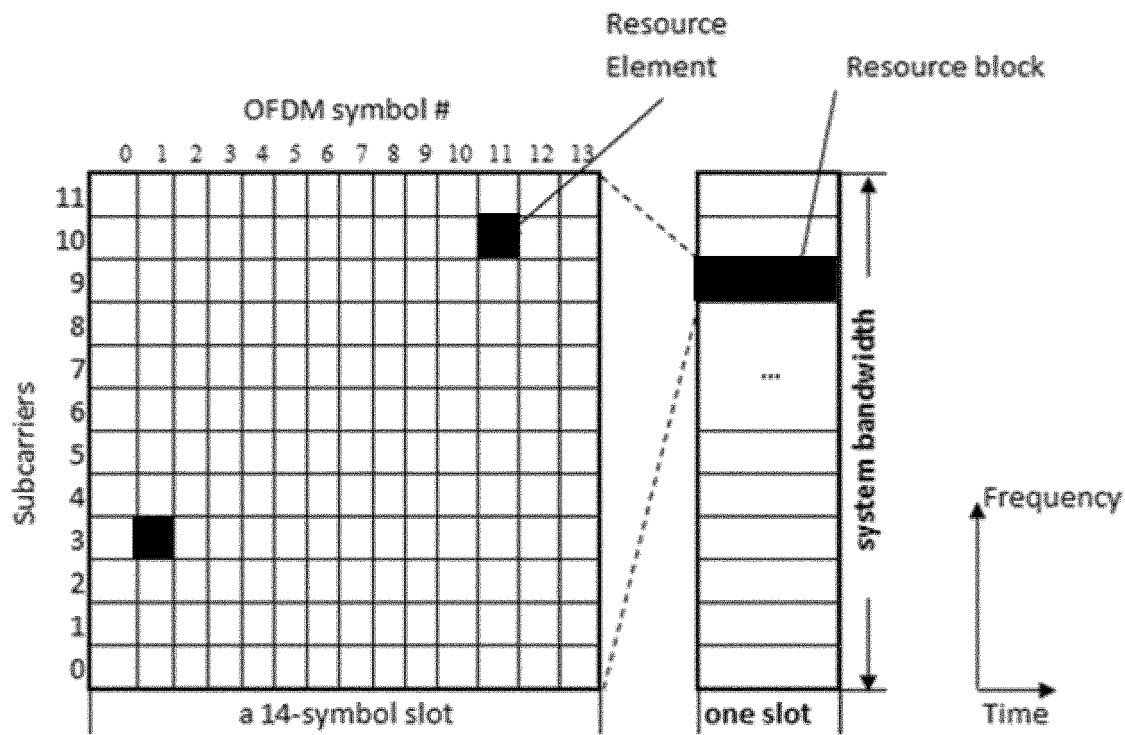
FIG. 5 shows an exemplary time-frequency resource grid for an NR slot.
Figure 6A:
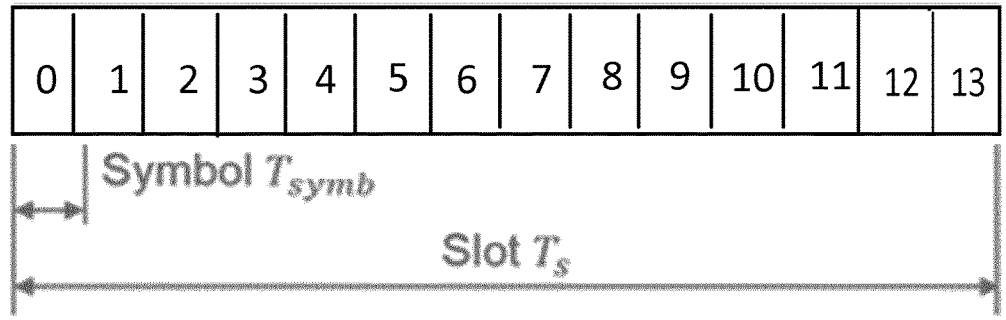
FIG. 6A shows an exemplary NR slot configuration of 14 OFDM symbols.
Figure 6B:
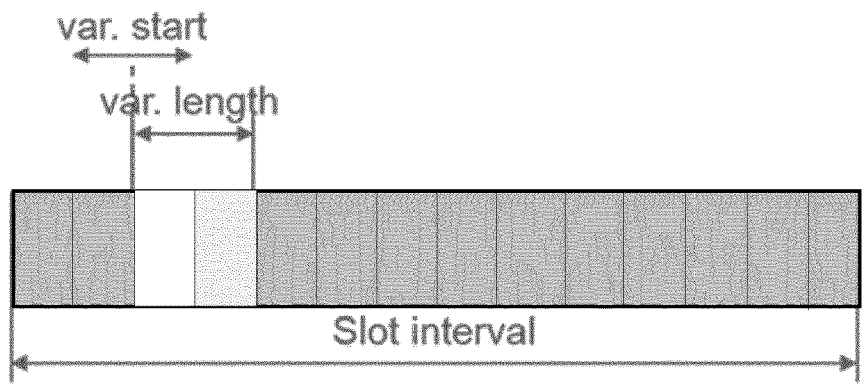
FIG. 6B shows an exemplary two-symbol NR mini-slot.

In some exemplary embodiments, processor 700 can utilize a direction-of-arrival estimate or other available information to determine appropriate weights (e.g., $W_R$ or $W_T$) to cause the antenna array 750 to produce one or more beam patterns directed to a particular angular direction relative to the antenna array. For example, as shown in FIG. 5, by applying the appropriate weights (e.g., $W_R$ or $W_T$) to the signals received from the antenna elements 750a through 750i, the antenna array 750 can capture signals and/or multipath components that are incident in the directions of arrival corresponding to beams 760a and 760b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 700 can program and/or configure receive gain/phase controls 730 and/or transmit gain/phase controls 735 with weights (e.g., $W_R$ or $W_T$, respectively) corresponding to the desired angular direction. Processor 700 can determine weights using various beam-steering or beam-forming algorithms know to persons of ordinary skill, including parametric algorithms and codebook-based algorithms. According to various exemplary embodiments, receive gain/phase controls 730 and/or transmit gain/phase controls 735 can comprise one or more programmable amplifiers that modifies the amplitude and/or phase of the signals (e.g., at RF or IF) from the array elements 750a through 750i. When no gain or phase adjustment of the signals to/from array elements 750a through 750i is required, the processor 700 can program the respective elements of controls 730 and/or 735 to unity gain and zero phase.

In further exemplary embodiments, processor 700 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 700 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

More generally, persons of ordinary skill in the art will recognize that various protocols and other functions of the exemplary device shown in FIG. 7 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware. For example, such various combinations can be utilized to execute various communication protocols specified by 3GPP and improvements described herein.

In June 2018, 3GPP has started a new study-item titled "User-Equipment (UE) Power Savings for NR." One of the objectives of this study item is to assess the energy consumption of a UE operating in a NR network. Specifically, from a PHY perspective, the goal is to analyze the various layer-1 (L1) features that can result in increased UE energy consumption, and propose solutions to reduce such energy consumption. In the following discussion, the terms "energy consumption" and "power consumption" are used interchangeably with the understanding that power is energy per unit time.

One promising area for achieving improvements in UE power consumption is in the UE monitoring of the PDCCH. As mentioned above, PDCCH carries control information from network to UE, including system information, downlink scheduling grants, uplink scheduling grants, downlink/uplink resources for UE to use, slot formats, etc. As also mentioned above, an NR PDCCH is confined to a particular region of each downlink slot, which is referred to as the CORESET.

One main reason for high UE power consumption when monitoring the NR PDCCH is the large number of possible PDCCH candidates that a UE must decode before being able to detect its own dedicated PDCCH channel. These PDCCH candidates needing to be monitored are typically referred to collectively as a "search space." In NR Release-15, the number of PDCCH candidates per slot is limited to a maximum value that depends upon the numerology used. For example, for numerologies of 15, 30, 60, and 120 kHz, the maximum number of candidates per slot are 44, 36, 22, and 20, respectively. Thus, in combination with the number of PDCCH monitoring occasions and the traffic type, the UE energy consumption can be significant over the duration of the traffic.

The UE energy consumption during NR PDCCH monitoring can be divided primarily into baseband energy consumption and analog/RF energy consumption. The baseband consumption for PDCCH monitoring involves all baseband processing related to PDCCH decoding. For example, in the context of FIG. 7, this can include the PDCCH-related operations performed by baseband processor 700. Likewise, the RF power consumption relates to all the RF processing required for the reception of the PDCCH signal in the UE device. The RF components include the number of antenna elements used, the power amplifiers, mixers, analog-to-digital converters and filters to name a few. For example, in the context of FIG. 7, this can include antenna elements 750, LNA(s) 740, weight circuits 730, and receiver 710 (including conversion circuit 715).

Typically, the UE must have an independent receive chain for each DL transmission layer it is capable of receiving. In the context of the example shown in FIG. 7, each receive chain can include an antenna element (e.g., 750a-i), a corresponding LNA (e.g., 740a-i), and a corresponding weight circuit (e.g., 730a-i). In addition, some portion of receiver 710 (including conversion circuit 715) can be unique to each receive chain, while other portions of receiver 710 can be shared among the various receive chains. Each of these independent receive chains consumes a certain amount of energy when operational. In NR Release-15, UEs can support up to eight DL transmission layers. As such, UEs must have at least eight receive antennas (with corresponding receive chains) to support the reception of eight DL transmission layers. While providing improvements in performance, the larger number of receive chains can also increase UE energy consumption.

Conventionally, PDCCH is transmitted using a single layer and, as such, one antenna suffices for PDCCH reception during most link conditions. Even so, in conventional operation, the UE generally uses its full antenna resources for PDCCH monitoring due to the possible need to subsequently receive a full-rank PDSCH transmission scheduled by a PDCCH message. This is due in part to the delay involved in activating a receive chain for operation. For example, when same-slot scheduling is used, the UE could expect a potential eight-layer PDSCH transmission in the same slot as the scheduling PDDCH message and, due to the activation delay, must keep all eight receive chains active during PDCCH monitoring. In case cross-slot scheduling is used (i.e., PDSCH follows in a subsequent slot), activating all receiver antennas for PDCCH reception leads to even greater unnecessary UE power consumption. However, the UE generally does not know whether same- or cross-slot scheduling is used until it receives the PDCCH message containing the PDSCH scheduling information.

By using a lower number of antennas and receive chains (e.g., as low as one), the UE energy consumption can be reduced significantly. Even so, reducing the number of antennas for reception compromises the quality (e.g., link quality) of the received PDCCH signal. However, if the UE sees a good PDCCH link quality, then there is no need for the UE to operate higher number of antennas since reliable reception of the PDCCH signal can take place with a lower number of (e.g., as low as one) antennas and receive chains. On the other hand, if a multi-layer (e.g., MIMO) PDSCH reception is within the same slot of PDCCH reception, then the UE may not have time to switch on additional receive chains after the PDCCH reception using a single receive chain. Thus, the UE must also consider the subsequent PDSCH transmission before lowering the number of antennas for a PDCCH reception.

Accordingly, there is a need to reduce UE power consumption by reducing the antenna configuration for PDCCH monitoring when possible, while still providing sufficient reception of PDCCH and facilitating reception of a subsequent, multi-layer PDSCH transmission scheduled by a received PDCCH message.

Exemplary embodiments of the present disclosure can address these and other issues, problems, and/or difficulties by providing a flexible mechanism for determining the minimum number of antennas and receive chains required for PDCCH reception. In making this determination, exemplary embodiments can take in account various information available to the UE including, but not limited to: 1) DCI-format, CORESET, and search-space configurations (referred to as "factor 1"); 2) current radio link quality or other link parameters ("factor 2"); 3) the set of values of the slot offset (k0) parameter between the PDCCH and the PDSCH that it schedules (i.e., via DL grants) ("factor 3").

For example, based on factors 1 and 2, the UE can determine the robustness of the potential PDCCH candidates (e.g., respective link qualities) within the search space, and thereby determine the expected reception performance and a trade-off between potential power savings and potential performance loss as a function of the number of antennas. For example, if the UE determines that a lower number of antennas and receive chains can satisfy a predetermined performance criterion, then the UE can achieve power savings by reducing the number used for PDCCH reception accordingly.

As a further example, based on factor 1, the UE determine whether DCI formats that can be carried by PDCCH can include PDSCH transmission techniques needing multiple UE antennas and/or receive chains for correct PDSCH reception. For example, if the UE is configured to receive simple DCI formats only (e.g., indicating single-layer PDSCH transmission) without the possibility of multi-layer PDSCH scheduling, the UE could turn off its receiver chains regardless of whether the time-domain configuration indicates same-slot or inter-slot PDSCH scheduling. More generally, the UE can leave activated the number of receiver chains corresponding to the maximum number of PDSCH transmission layers than can be indicated by a particular DCI format, with the remainder being turned off/deactivated.

For NR, the set of possible values of the slot offset parameter, k0, is indicated in a time-domain resource allocation table, while the particular k0 associated with a scheduled PDSCH is indicated in DCI as an index into the table. As yet another example, based on factor 3, even if (e.g., based on factor 1) the UE determines that a PDSCH requiring a particular number of antennas can be scheduled, the UE can determine to use less than this number of antennas to monitor the PDCCH so long as its receive chain activation delay is less than the minimum k0 value in the time-domain resource allocation table.

In this manner, exemplary embodiments facilitate lower RF power consumption for the UE during PDCCH reception, thereby reducing the overall power consumption during PDCCH monitoring. Furthermore, exemplary embodiments can achieve these advantages without impacting the performance of the network. For example, all of the information comprising factors 1-3 discussed above can be provided and/or available to the UE during existing network configuration and/or setup operations, such that no additional signaling between UE and network is required.

Figure 8:
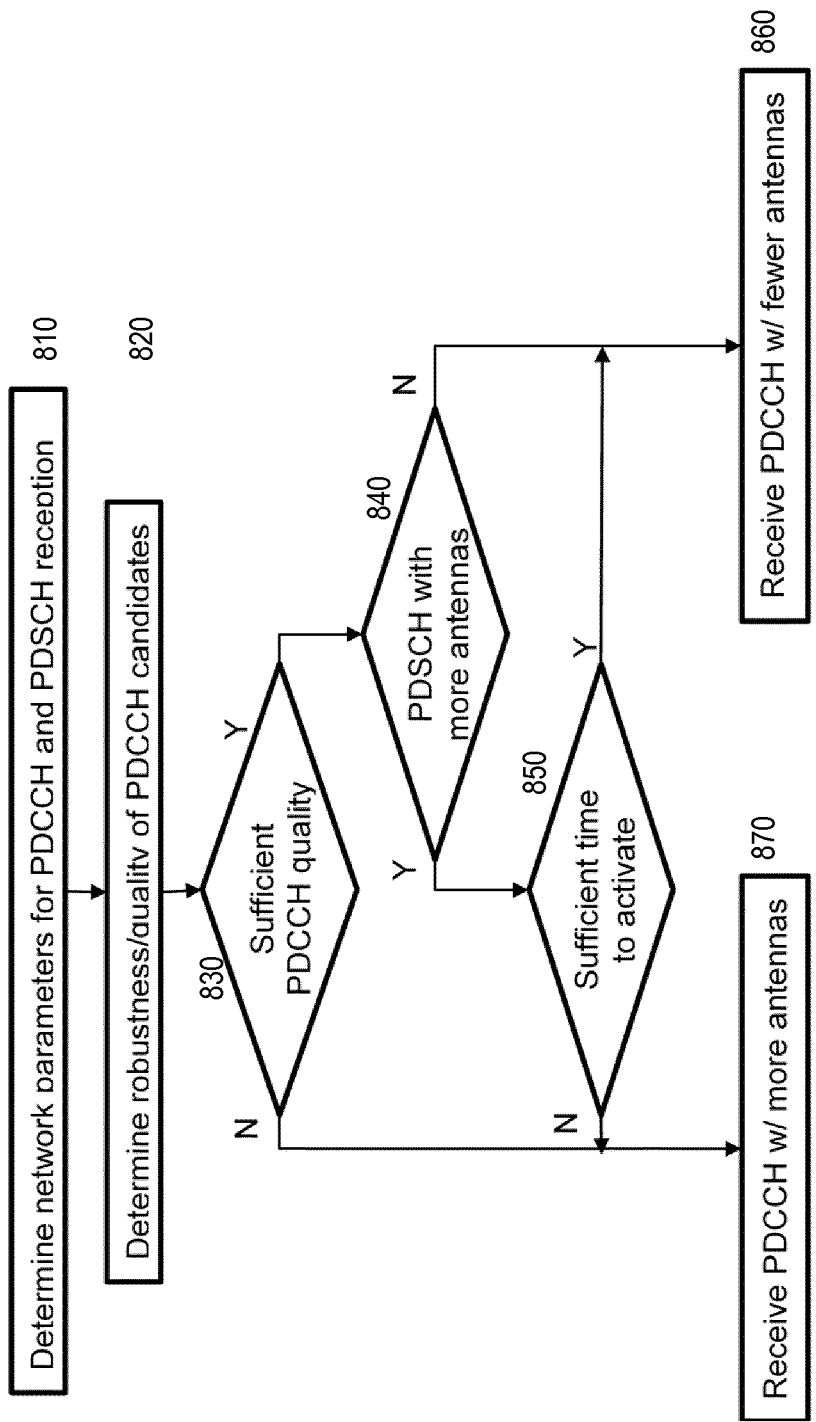
FIG. 8 shows a flow diagram of an exemplary method and/or procedure according to various exemplary embodiments of the present disclosure.

FIG. 8 shows a flow diagram of an exemplary method and/or procedure according to various exemplary embodiments of the present disclosure. The exemplary method and/or procedure can be performed by a UE (e.g., wireless device, IoT device, modem, etc. or component thereof) in communication with a network node (e.g., base station, eNB, gNB, etc., or component thereof). Although the operations shown in FIG. 8 are labelled in a numerical order, this order is exemplary and the operations shown in FIG. 8 can be performed in a different order and can be combined and/or divided into blocks having different functionality.

In operation 810, the UE can determine network parameters for PDCCH and PDSCH reception (e.g., within a cell served by the network node). For example, the UE can receive the parameters for PDCCH and PDSCH reception from the network via broadcast and/or dedicated (e.g., RRC) signaling. The network parameters can include the configured CORESET types, the configured search spaces, associated DCI-formats, and PDSCH slot offset parameter k0.

In operation 820, the UE can determine the robustness and/or quality of the potential PDCCH candidates. This can be determined based on code rates used for the respective PDCCH candidates and the channel conditions for PDCCH reception. Code rate of a potential PDCCH candidate can be determined based on the size of the monitored DCI format, the aggregation levels (AL) of the candidates according to the search space, and the QPSK modulation scheme used for PDCCH transmission.

For example, the UE can determine channel and/or link quality based on various measurements of downlink reference signals (RS) transmitted by the network node. For example, the UE can estimate link quality (e.g. achievable SNR, SIR, SINR, receiver power, etc.) for different antenna configurations (e.g., different numbers of antennas) based on demodulation RS (DMRS) previously received together with PDCCH from the same cell. Alternately, the UE can estimate link quality for different antenna configurations based on CSI-RS, TRS, PTRS, SSB, etc.

In some embodiments, the UE can explicitly determine a link quality metric for all antenna configurations of interest explicitly based on expected baseband processing (e.g. channel estimation and combining weight computation) for the different configurations. In other embodiments, the UE can determine a link quality metric for a particular antenna configuration (e.g., a default configuration) and apply predetermined offsets to derive link quality metrics for other configurations of interest.

In operation 830, the UE can determine whether a particular number of antennas and receive chains (e.g., $N_R$) can provide sufficient PDCCH reception quality. For example, the UE can determine whether, in view of the robustness and/or quality of the potential PDCCH candidates determined in operation 830, using $N_R$ antennas (e.g., for diversity gain) can meet one or more block error rate (BLER) requirements for the respective PDCCH candidates. If the UE determines that $N_R$ antennas provide insufficient PDCCH reception quality, the UE proceeds to operation 870, where the UE can receive PDCCH with a greater number of antennas than $N_R$ (e.g., $N_R+1$).

On the other hand, if the UE determines that $N_R$ antennas provide sufficient PDCCH reception quality, the UE proceeds to operation 840, where it can determine whether it will be required to receive PDSCH using a greater number of antennas than $N_R$ and within a predetermined duration after receiving PDCCH. In some embodiments, based on the possible DCI formats the UE is configured to receive on PDCCH, the UE can determine whether or not the network can schedule the UE (via DCI) to receive a subsequent PDSCH transmission that require more than $N_R$ antennas and receive chains (e.g., wider-bandwidth and/or multi-layer reception). For example, the UE can determine that it is configured to receive only simple DCI formats that can schedule only single-layer PDSCH transmissions of the same bandwidth as PDCCH. In such case, the UE proceeds to operation 860 where it can receive and/or monitor PDCCH using $N_R$ antennas and receive chains.

On the other hand, if the UE determines in operation 840 that it can be scheduled to receive PDSCH transmissions that require more than $N_R$ antennas and receive chains (e.g., an M-layer PDSCH transmission, where $M>N_R$), the UE proceeds to operation 850. In this operation, the UE can determine whether it has sufficient time to activate the additional receive chains. In this operation, the UE can consider the PDCCH-to-PDSCH slot offset parameter (k0 in DCI) that indicates the time available for the UE to activate receive chains. For example, the UE can compare k0 to a required activation time, t0. If k0 indicates a relatively short PDCCH-to-PDSCH slot offset that is less than t0, the UE can determine that it does not have sufficient time after PDCCH reception to activate additional receive chains needed to receive a potentially wider-bandwidth and/or multi-layer PDSCH transmission. In such case, the UE can proceed to operation 870, where it can activate M receive chains to receive and/or monitor PDCCH and PDSCH, if scheduled.

On the other hand, if k0 indicates a relatively long PDCCH-to-PDSCH slot offset that is greater than or equal to t0, the UE can determine that it has sufficient time after PDCCH reception to activate additional receive chains needed to receive a potentially wider-bandwidth and/or multi-layer PDSCH transmission. In such case, the UE can proceed to operation 860, where it can receive and/or monitor PDCCH using $N_R$ antennas and receive chains.

Figure 9:
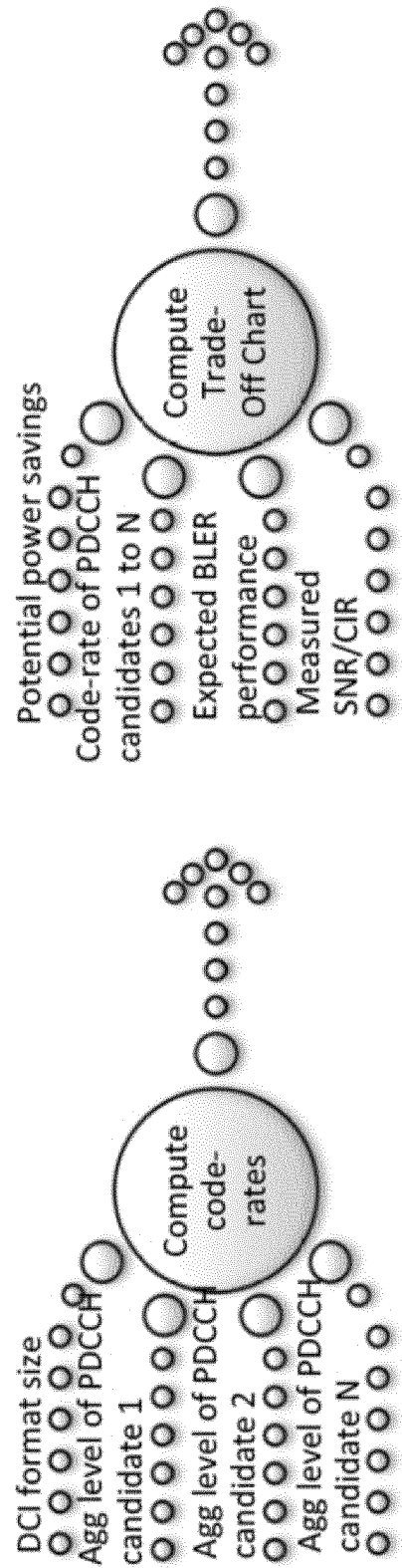
FIG. 9 is a graphical depiction of the input factors used in various determinations of the exemplary method and/or procedure shown in FIG. 8.

FIG. 9 is a graphical depiction of the input factors used in various determinations of the exemplary method and/or procedure shown in FIG. 8. For example, the code rates of the various PDCCH candidates 1-N can be determined from the size (e.g., in bits) of the DCI format to be monitored and the respective aggregation levels of PDCCH candidates 1-N. Similarly, FIG. 9 illustrates various factors used to compute and/or determine a "trade-off chart" between power savings and performance loss as a function of the number of antennas. These factors include the determined PDCCH candidate code rates, potential power savings, expected BLER performance, and measured link quality (e.g., SNR, CIR, etc.). A trade-off chart determined in this manner can be used for PDCCH antenna selection. Both aspects shown in FIG. 9 are explained further below using illustrative examples.

As used herein, the term "trade off chart" refers to a technique for representing the relationship between power reduction and performance degradation of PDCCH reception when the number of receive chains is reduced. Various exemplary trade-off charts are discussed below. Even so, other formats, data structures, techniques, etc. can be used to represent this relationship according to various exemplary embodiments of the present disclosure.

In one example, the UE includes four (4) antennas and receive chains that can be used for PDCCH/PDSCH reception. In this example, the UE is configured by the network with a bandwidth of 270 PRBs, $\Delta f=30$ kHz, and CORESET parameters of 252 PRB bandwidth, one symbol, and non-interleaved transmission. For this CORESET, the UE is configured to monitor a DCI format having a size of 60 bits, and the search space comprises two PDCCH candidates with each candidate having an aggregation level (AL) of eight. In addition, the configured slot offset parameters are k0={1, 2}.

Based on this exemplary configuration, the UE can determine the code rates as follows. The number of subcarriers used by both PDCCH candidates are the same since they have the same AL. Thus, the number of subcarriers used is equal to 576 (calculated as (8 control channel elements) times (6 resource element groups) times 12). Of these 576 subcarriers, about 25% are used for the DMRS needed for channel estimation. Thus, the effective number of subcarriers that carry the DCI bits is 432.

Since the modulation for PDCCH is QPSK, each subcarrier carries two information bits. Thus, the total number of bits carried by each PDCCH candidate is 864 bits. Since these bits are coded bits, where the encoder input is 60-bit DCI message, the code-rate is equal to 60÷864=0.06 for both PDCCH candidates (although the actual code-rate might vary slightly from this nominal figure). This code rate indicates that both PDCCH candidates are very robust.

Using these determined code rates, the UE can create a trade-off chart such as shown in Table 2 below. In addition to the code rates, Table 2 includes the measured SNR (in dB) for each of the candidates. These SNR values can be based on radio resource management (RRM) measurements and/or DM-RS associated with previous PDCCH/PDSCH reception. For each PDCCH candidate, Table 2 also includes two additional metrics for all antenna configurations of interest. In this example, configurations having 1, 2, 3, and 4 antennas are of interest. For each configuration, Table 2 includes a power consumption (in Watts) of PDCCH monitoring. Note that in this example, the power consumption increases in linear proportion to the number of antennas and receive chains activated for PDCCH monitoring.

TABLE 2

| Candidates | Code-Rate | Measured SNR [dB] | Number Antennas | Expected SNR @ 1% BLER [dB] | Power Consumption [Watts] |
|---|---|---|---|---|---|
| PDDCH candidate 1 | 0.06 | −1 | 1 | −5.0 | 1 |
|  |  |  | 2 | −5.3 | 2 |
|  |  |  | 3 | −5.6 | 3 |
|  |  |  | 4 | −5.9 | 4 |
| PDDCH candidate 2 | 0.06 | −2 | 1 | −5.0 | 1 |
|  |  |  | 2 | −5.3 | 2 |
|  |  |  | 3 | −5.6 | 3 |
|  |  |  | 4 | −5.9 | 4 |

In addition, for each configuration, Table 2 includes an SNR needed to achieve no more than 100 BLER, which is a conventional metric used for characterizing PDCCH performance. BLER performance is a function of code-rate and number of antennas so, as seen from Table 2, using more antennas allows the UE to achieve the same 1% performance at a lower SNR. Even so, BLER is exemplary and other metrics can be used and/or included in relevant 3GPP specifications.

Alternatively, UE-specific metrics for minimum performance requirements can be used. Such metrics can be determined based on performance evaluation with different antenna configurations for different DCI configurations. In addition to BLER, other metrics such as missed detection rate can be utilized.

Using Table 2 and the slot offset values k0={1, 2}, the UE can determine the number of antennas to use for PDCCH reception. Table 2 shows that for the computed code-rates, the BLER performance is easily met because the measured SNR for both candidates is much higher than the SNR performance metric. Furthermore, using only one antenna enables the UE to meet the BLER performance metric. Thus, the UE determines that it needs only one antenna and receive chain for reliable reception of the PDCCH signal.

Before making the final determination, however, the U can also consider the PDCCH-to-PDSCH slot offset values k0={1, 2}. In this example, the minimum slot offset value is one. In other words, if the U decides to choose one antenna for PDCCH reception then it has, in the worst-case, one slot duration to activate one or more additional receive chains for a MIMO PDSCH reception. In this example, the UE determines that one slot is sufficient and, consequently, selects one antenna and receive chain for subsequent PDCCH monitoring and/or reception.

In a second example, the UE is configured with the same parameters as the first example, except that the second PDCCH candidate is configured with AL=2. As such, the code-rate of PDCCH candidate 1 is still 0.06 but the code-rate of PDCCH candidate 2 is now 0.27 (e.g., 60 bits/(2*6*12*2*0.75 coded bits)). Table 3 below shows the trade-off chart corresponding to this example. More specifically, Table 3 shows that for PDCCH candidate 2, the BLER metric is satisfied when the number of antennas is greater than or equal to three. Thus, the achievable power savings is limited to deactivating one of the four receive chains during PDCCH reception. As in the first example, slot offset values k0={1, 2} allows the UE to choose three antennas for PDCCH reception without compromising possible MIMO PDSCH reception.

TABLE 3

| Candidates | Code-Rate | Measured SNR [dB] | Number Antennas | Expected SNR @ 1% BLER [dB] | Power Consumption [Watts] |
| --- | --- | --- | --- | --- | --- |
| PDDCH candidate 1 | 0.06 | −1 | 1 | −5.0 | 1 |
| | | | 2 | −5.3 | 2 |
| | | | 3 | −5.6 | 3 |
| | | | 4 | −5.9 | 4 |
| PDDCH candidate 2 | 0.27 | −2 | 1 | −1.0 | 1 |
| | | | 2 | −1.5 | 2 |
| | | | 3 | −2.0 | 3 |
| | | | 4 | −2.5 | 4 |

In a third example, the UE is configured with the same parameters as the first example, except that the set of slot offset values k0={0, 1}. These parameters produce the same trade-off chart as shown in Table 2 above, and the UE determines that it needs only one antenna and receive chain for reliable reception of the PDCCH signal. However, the minimum slot offset value is zero, meaning that a subsequent PDSCH transmission can be scheduled in the same slot as the PDCCH. Thus, if the UE uses only one antenna for PDCCH reception then it may not have enough time to turn-on the remaining off RF-chains for a potential higher-layer PDSCH transmission. Accordingly, in this example, the UE selects four antenna and receive chains for subsequent PDCCH monitoring and/or reception.

In some embodiments, such as when the UE's power consumption is in a critical situation (e.g., low battery, poor link quality, etc.), the UE can request the network to configure a PDCCH search-space that is favorable to the UE from a power savings perspective. The UE can make such a request using, e.g., channel quality indicator (CQI) report, UE assistance information, etc. The UE and network can negotiate and/or agree upon a favorable PDCCH search space in advance of such an event, such as during network configuration of the UE.

In some embodiments, the UE can apply antenna reduction even when the DCI search parameters do not guarantee cross-slot scheduling and/or abstaining from multi-layer PDSCH. For example, the UE can determine from statistics related to recent PDCCH reception that the network schedules PDSCH transmissions in a manner that facilitates PDCCH antenna reduction despite a non-limiting DCI format range. In some embodiments, the UE can observe PDSCH scheduling statistics for a predetermined duration (e.g., M most recent PDCCH receptions by the UE). Based on these observed statistics, the UE can select a power-efficient PDCCH monitoring configuration (e.g., fewer antennas and receive chains). On the other hand, if during subsequent operation the UE encounters one or more PDCCH-to-PDSCH slot offsets in which the UE was unable to properly receive PDSCH due to antenna limitation, the UE can revert to monitoring the PDCCH using a full antenna set.

In some embodiments, when determining trade-offs between power savings and performance, the UE can determine the performance metric for reliable PDCCH reception based on a similar performance metric configured by the network for PDSCH reception. For example, if the determines that the network has configured a 10% PDSCH first transmission BLER target, the UE can use a lower PDCCH target BLER (e.g., 2-5%) during the trade-off analysis.

In some embodiments, if the UE has been configured with multiple search spaces for simultaneous PDCCH monitoring during a particular DCI occasion, the UE can perform the above-described methods and/or procedures on the search space that includes the least robust DCI format. In other embodiments, the UE can perform the above-described methods and/or procedures on the search space associated with the service and/or bearer with highest reliability or latency requirements.

In some embodiments, the network can cooperate with the UE to facilitate PDCCH monitoring with a reduced number of antennas. For example, the network may configure the UE with specific PDCCH configurations that facilitate PDCCH monitoring with a reduced number of antennas. As another example, the network can configure the UE with multiple PDCCH search spaces, where at least a portion are "power friendly" to the UE, e.g., robust PDCCH formats, small number of PDSCH layers, and/or sufficiently PDCCH-to-PDSCH slot offsets.

In some embodiments, the UE may request from the network a configuration of one or more parameters that can facilitate PDCCH monitoring with a reduced number of antennas. For example, the UE can request parameters (e.g., BWP, search space, AL, etc.) associated with a robust PDCCH configuration. Likewise, the UE can request a particular PDCCH-to-PDSCH slot offset (or range of offsets, e.g., k0>1), or a particular DCI format (e.g., DCI format 10) that predictably excludes multi-layer PDSCH scheduling.

In some embodiments, the UE can indicate to the network a preference for PDCCH robustness by modifying its channel quality report, such as by adding an offset to a measured metric (CSI, CQI, SINR, etc.) prior to reporting it to the network. In some embodiments, the particular offset and/or the ability of the UE to apply it when reporting can be configured by the network. Alternately, the UE can autonomously determine and/or apply the offset.

In some embodiments, the UE can indicate to the network a preference for PDCCH monitoring with some reduced number of antennas and receive chains. In response, the network can configure the UE with one or more PDCCH search spaces and provide an indication that at least a portion of the configured search spaces can be monitored with a reduced number of antennas. Alternately, the UE can autonomously detect that at least a portion of the configured search spaces can be monitored with a reduced number of antennas.

Figure 10:
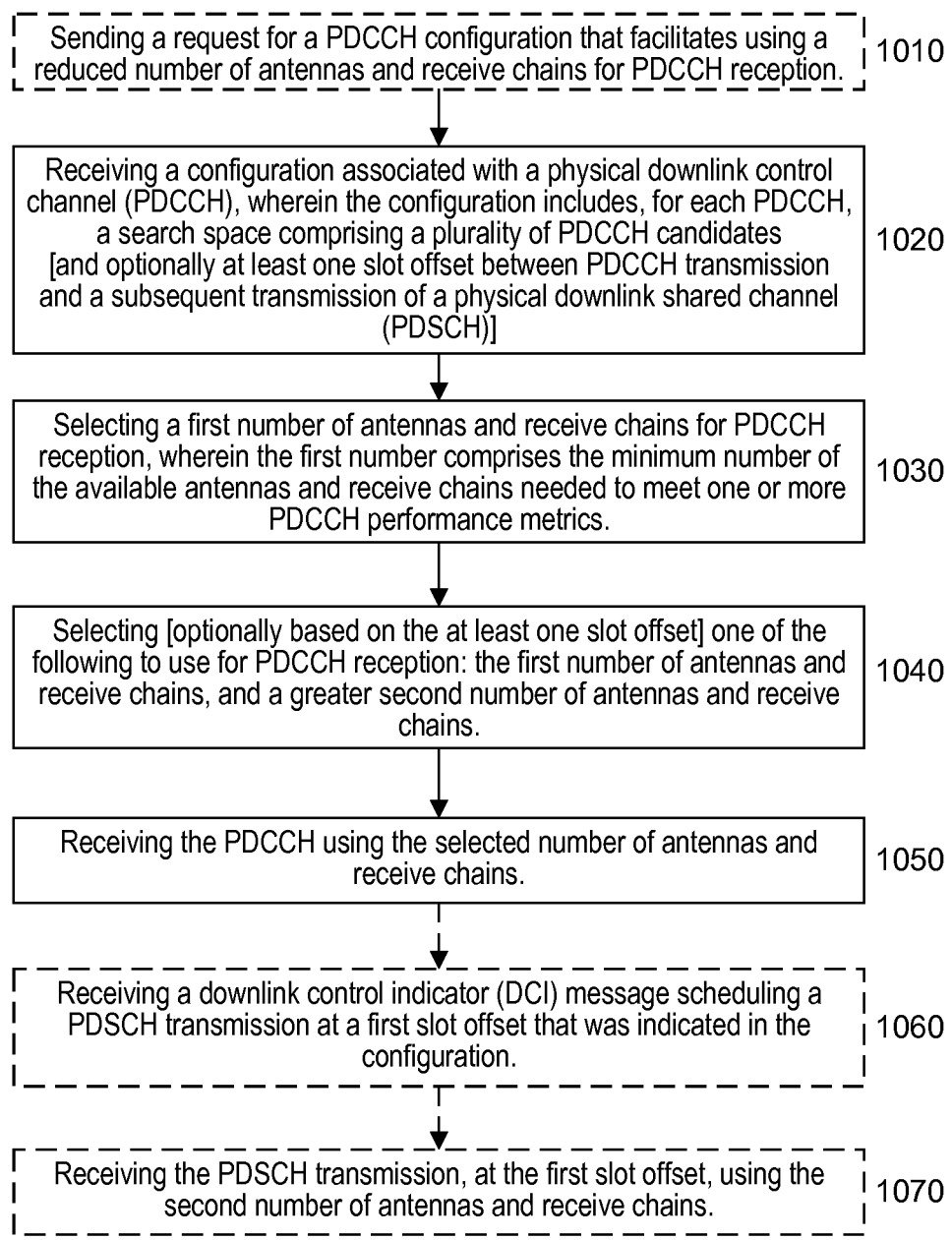
FIG. 10 shows a flow diagram of an exemplary method and/or procedure performed by a user equipment (UE, e.g., wireless device, IoT device, etc.), according to various exemplary embodiments of the present disclosure.

FIG. 10 shows a flow diagram of an exemplary method and/or procedure for receiving a physical downlink control channel (PDCCH) using a selectable number of available antennas and receive chains, according to various exemplary embodiments of the present disclosure. The exemplary method and/or procedure can be performed by a user equipment (UE, e.g., wireless device, IoT device, modem, etc. or component thereof) in communication with a network node (e.g., base station, gNB, en-gNB, etc., or component thereof). For example, the exemplary method and/or procedure shown in FIG. 10 can be implemented in a UE or wireless device configured according to FIG. 12 (described below). Furthermore, the exemplary method and/or procedure shown in FIG. 10 can be utilized cooperatively with the exemplary method and/or procedure shown in FIG. 11 (described below), to provide various exemplary benefits described herein. Although FIG. 10 shows blocks in a particular order, this order is merely exemplary, and the operations of the exemplary method and/or procedure can be performed in a different order than shown in FIG. 10 and can be combined and/or divided into blocks having different functionality. Optional blocks or operations are shown by dashed lines.

Exemplary embodiments of the method and/or procedure illustrated in FIG. 10 can include the operations of block 1020, where the UE can receive a configuration associated with one or more PDCCHs. The configuration can include, for each PDCCH, a search space comprising a plurality of PDCCH candidates. In some embodiments, each PDCCH candidate can be associated with at least one of the following: a format and a location in the search space. In some embodiments, the received configuration can also include at least one slot offset between PDCCH transmission and a subsequent transmission of a physical downlink shared channel (PDSCH).

In some embodiments, the exemplary method and/or procedure can include the operations of block 1010, where the UE can send a request for a PDCCH configuration that facilitates using a reduced number of antennas and receive chains for PDCCH reception. In such embodiments, the configuration received in block 1020 can be in response to this request. In some embodiments, the request can identify a particular PDCCH configuration. In some embodiments, the request can identify one or more of the following: a search space configuration, a DCI format, PDCCH frequency resources, an aggregation level, and a slot offset between transmission of the PDCCH and a subsequent transmission of a PDSCH.

The exemplary method and/or procedure can also include the operations of block 1030, where the UE can select a first number of antennas and receive chains for PDCCH reception, wherein the first number comprises the minimum number of the available antennas and receive chains needed to meet one or more PDCCH performance metrics. In some embodiments, the first number can be one. In some embodiments, selecting one of the first number or the greater second number of antennas and receive chains is based on the at least one slot offset (e.g., received in block 1020).

In some embodiments, selecting a first number of antennas and receive chains for PDCCH reception can include: determining a link quality and a code rate associated with each PDCCH candidate; determining, for each PDCCH candidate based on the associated code rate, one or more performance metrics for each of a plurality of candidate numbers of antennas and receive chains; and selecting, as the first number, the minimum of the candidate numbers for which link qualities associated with all PDCCH candidates are greater than or equal to the corresponding one or more performance metrics. In some embodiments, at least two of the plurality of PDCCH candidates can be associated with different code rates.

In some embodiments, the one or more PDCCHs can comprise a plurality of PDCCHs, each PDCCH being associated with a respective minimum of the candidate numbers of antennas and receive chains. In such case, selecting the first number can also include selecting, as the first number, the maximum of the respective minima of the candidate numbers. For example, if the UE is required to monitor two PDCCHs, the UE can select the larger of the two minimum candidate numbers determined for the respective PDCCHs.

In some embodiments, the link quality associated with each PDCCH candidate can be determined based on measurements made on one or more reference signals (RS) associated with one or more previous PDCCH transmissions. In some embodiments, determining the link quality associated with each PDCCH candidate can include determining, for each PDCCH candidate, a link quality associated with each of the plurality of candidate numbers of antennas and receive chains. In some embodiments, this operation can further include determining a first link quality associated with a first candidate number based on the measurements made on the one or more RS using the first candidate number of antennas and receive chains; and determining further link qualities associated with the other candidate numbers based on the first link quality and respective predetermined offset values.

The exemplary method and/or procedure can also include the operations of block 1040, where the UE can, based on the slot offset, select one of the following to use for PDCCH reception: the first number of antennas and receive chains, and a greater second number of antennas and receive chains. In some embodiments, the second number can be the minimum number of the available antennas and receive chains that are required to correctly decode the subsequent PDSCH transmission. In some embodiments, the second number can be the number of available antennas and receive chains.

In some embodiments, the received configuration can include a format of downlink control indicator (DCI) messages transmitted on the PDCCH. In such embodiments, selecting one of the first and second numbers of antennas and receive chains comprises determining whether the format of DCI messages can indicate at least one PDSCH transmission format that requires the second number of antennas and receive chains for correct decoding. In some embodiments, the at least one PDSCH transmission format comprises at least one of the following: a multi-layer PDSCH transmission; and a PDSCH transmission that uses additional frequency-domain resources than the PDCCH (e.g., different and/or additional BWPs).

In some embodiments, selecting one of the first and second numbers of antennas and receive chains in block 1040 can also include, if it is determined that the format of the DCI messages can indicate the at least one PDSCH transmission format, determining whether the minimum of the at least one slot offset is less than a predetermined duration. Furthermore, if it is determined that the minimum is less than the predetermined duration, the operations in block 1040 can include selecting the second number of antennas and receive chains. In some embodiments, the predetermined duration can be based on the time required to activate additional antennas and receive chains.

In some embodiments, selecting one of the first and second numbers of antennas and receive chains in block 1040 can also include, if it is determined that the slot offset is greater than or equal to the predetermined duration, selecting the first number of antennas and receive chains. In some embodiments, selecting one of the first and second numbers of antennas and receive chains in block 1040 can also include, if it is determined that the minimum is less than the predetermined duration: determining whether the minimum was used during a predetermined number of previously received PDSCH transmissions; and if it determined that the minimum was not used during the predetermined number, selecting the first number instead of the second number.

The exemplary method and/or procedure can also include the operations of block 1050, where the UE can receive the PDCCH using the selected number of antennas and receive chains. In some embodiments, the exemplary method and/or procedure can also include the operations of block 1060, where the UE can receive a downlink control indicator (DCI) message scheduling a PDSCH transmission at a first slot offset that was indicated in the configuration. In some embodiments, the exemplary method and/or procedure can also include the operations of block 1070, where the UE can receive the PDSCH transmission, at the first slot offset, using the second number of antennas and receive chains.

Figure 11:
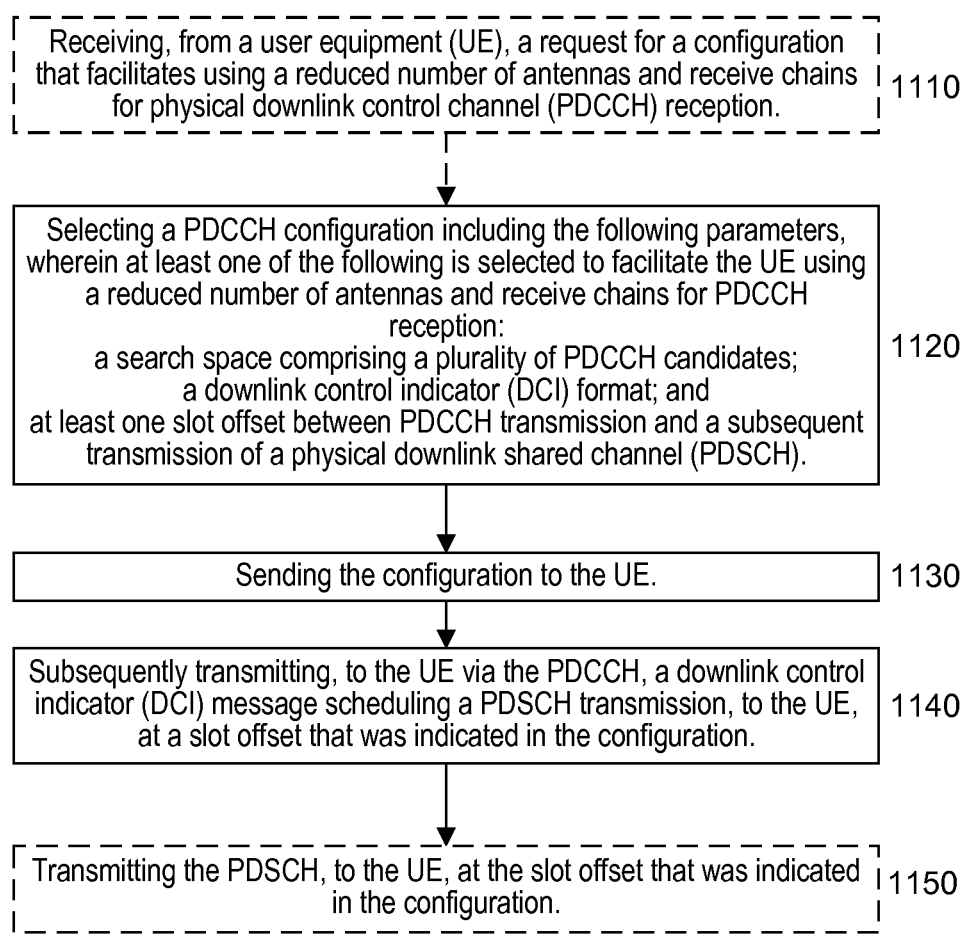
FIG. 11 shows a flow diagram of an exemplary method and/or procedure performed by a network node (e.g., base station, gNB en-gNB, etc.), according to various exemplary embodiments of the present disclosure.

FIG. 11 shows a flow diagram of an exemplary method and/or procedure for configuring a user equipment (UE) to receive a physical downlink control channel (PDCCH) using a selectable number of available antennas and receive chains, according to various exemplary embodiments of the present disclosure. The exemplary method and/or procedure can be performed by a network node (e.g., base station, gNB, en-gNB, etc., or component thereof) in communication with a UE (e.g., wireless device, IoT device, modem, etc. or component thereof). For example, the exemplary method and/or procedure shown in FIG. 11 can be implemented in a network node configured according to FIG. 13 (described below). Furthermore, the exemplary method and/or procedure shown in FIG. 11 can be utilized cooperatively with the exemplary method and/or procedure shown in FIG. 10 (described above), to provide various exemplary benefits described herein. Although FIG. 11 shows blocks in a particular order, this order is merely exemplary, and the operations of the exemplary method and/or procedure can be performed in a different order than shown in FIG. 11 and can be combined and/or divided into blocks having different functionality. Optional blocks or operations are shown by dashed lines.

Exemplary embodiments of the method and/or procedure illustrated in FIG. 11 can include the operations of block 1120, where the network node can select a PDCCH configuration including the following parameters, wherein at least one of the following is selected to facilitate the UE using a reduced number of antennas and receive chains for PDCCH reception: a search space comprising a plurality of PDCCH candidates; a downlink control indicator (DCI) format; and at least one slot offset between PDCCH transmission and a subsequent transmission of a physical downlink shared channel (PDSCH).

In some embodiments, the exemplary method and/or procedure can also include the operations of block 1110, where the network node can receive, from the UE, a request for a configuration that facilitates using a reduced number of antennas and receive chains for PDCCH reception. In such embodiments, the operations of block 1120 can be performed in response to this request. In some embodiments, the request can identify a particular PDCCH configuration. In some embodiments, the request can identify one or more of the following: a search space configuration, a DCI format, PDCCH frequency resources, an aggregation level, and a slot offset between transmission of the PDCCH and a subsequent transmission of a PDSCH.

The exemplary method and/or procedure can also include the operations of block 1130, where the network node can send the configuration to the UE. The exemplary method and/or procedure can also include the operations of block 1140, where the network node can subsequently transmit, to the UE via the PDCCH, a downlink control indicator (DCI) message scheduling a PDSCH transmission, to the UE, at a slot offset that was indicated in the configuration. In some embodiments, the exemplary method and/or procedure can also include the operations of block 1150, where the network node can transmit the PDSCH, to the UE, at the slot offset that was indicated in the configuration.

Figure 12:
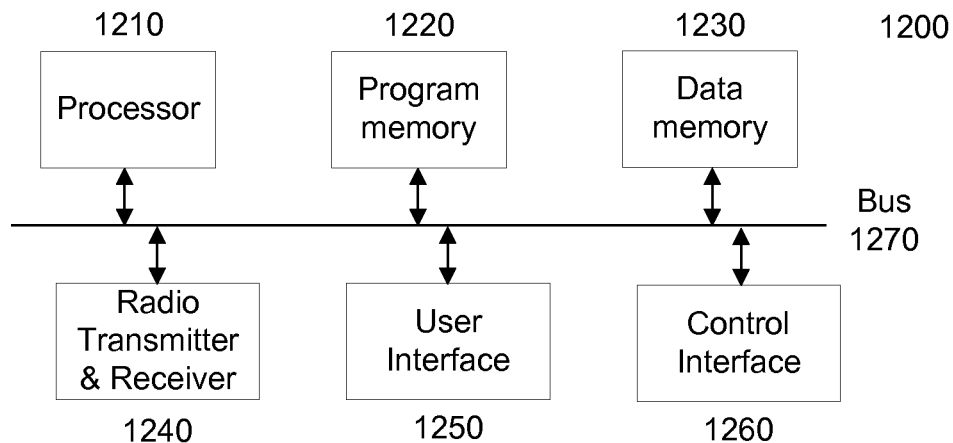
FIG. 12 is a block diagram of an exemplary wireless device or UE according to various exemplary embodiments of the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 12 shows a block diagram of an exemplary wireless device or user equipment (UE) 1200 according to various embodiments of the present disclosure. For example, exemplary device 1200 can be configured by execution of instructions, stored on a computer-readable medium, to perform operations corresponding to one or more of the exemplary methods and/or procedures described above.

Exemplary device 1200 can comprise a processor 1210 that can be operably connected to a program memory 1220 and/or a data memory 1230 via a bus 1270 that can comprise parallel address and data buses, serial ports, or other methods and/or structures known to those of ordinary skill in the art. Program memory 1220 comprises software code or program executed by processor 1210 that facilitates, causes and/or programs exemplary device 1200 to communicate using one or more wired or wireless communication protocols, including one or more wireless communication protocols standardized by 3GPP, 3GPP2, or IEEE, such as those commonly known as 5G/$N_R$, LTE, LTE-A, UMTS, HSPA, GSM, GPRS, EDGE, 1×RTT, CDMA2000, 1202.11 WiFi, HDMI, USB, Firewire, etc., or any other current or future protocols that can be utilized in conjunction with radio transceiver 1240, user interface 1250, and/or control interface 1260.

For example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1220 can also comprises software code executed by processor 1210 to control the functions of device 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from device 1200, from which the instructions can be downloaded into program memory 1220 located within or removably coupled to device 1200, so as to enable execution of such instructions.

Data memory 1230 can comprise memory area for processor 1210 to store variables used in protocols, configuration, control, and other functions of device 1200, including operations corresponding to, or comprising, any of the exemplary methods and/or procedures described herein. Moreover, program memory 1220 and/or data memory 1230 can comprise non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed. Persons of ordinary skill in the art will recognize that processor 1210 can comprise multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of device 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1240 can comprise radio-frequency transmitter and/or receiver functionality that facilitates the device 1200 to communicate with other equipment supporting like wireless communication standards and/or protocols. In some exemplary embodiments, the radio transceiver 1240 includes a transmitter and a receiver that enable device 1200 to communicate with various 5G/NR networks according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some exemplary embodiments, the radio transceiver 1240 includes an LTE transmitter and receiver that can facilitate the device 1200 to communicate with various LTE LTE-Advanced (LTE-A), and/or NR networks according to standards promulgated by 3GPP. In some exemplary embodiments of the present disclosure, the radio transceiver 1240 includes circuitry, firmware, etc. necessary for the device 1200 to communicate with various NR, NR-U, LTE, LTE-A, LTE-LAA, UMTS, and/or GSM/EDGE networks, also according to 3GPP standards. In some exemplary embodiments of the present disclosure, radio transceiver 1240 includes circuitry, firmware, etc. necessary for the device 1200 to communicate with various CDMA2000 networks, according to 3GPP2 standards.

In some exemplary embodiments of the present disclosure, the radio transceiver 1240 is capable of communicating using radio technologies that operate in unlicensed frequency bands, such as IEEE 1202.11 WiFi that operates using frequencies in the regions of 2.4, 5.6, and/or 60 GHz. In some exemplary embodiments of the present disclosure, radio transceiver 1240 can comprise a transceiver that is capable of wired communication, such as by using IEEE 1202.3 Ethernet technology. The functionality particular to each of these embodiments can be coupled with or controlled by other circuitry in the device 1200, such as the processor 1210 executing program code stored in program memory 1220 in conjunction with, or supported by, data memory 1230.

User interface 1250 can take various forms depending on the particular embodiment of device 1200, or can be absent from device 1200 entirely. In some exemplary embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the device 1200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1200 having a touch screen display are capable of receiving user inputs, such as inputs related to exemplary methods and/or procedures described herein or otherwise known to persons of ordinary skill in the art.

In some exemplary embodiments of the present disclosure, device 1200 can comprise an orientation sensor, which can be used in various ways by features and functions of device 1200. For example, the device 1200 can use outputs of the orientation sensor to determine when a user has changed the physical orientation of the device 1200's touch screen display. An indication signal from the orientation sensor can be available to any application program executing on the device 1200, such that an application program can change the orientation of a screen display (e.g., from portrait to landscape) automatically when the indication signal indicates an approximate 120-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1260 of the device 1200 can take various forms depending on the particular exemplary embodiment of device 1200 and of the particular interface requirements of other devices that the device 1200 is intended to communicate with and/or control. For example, the control interface 1260 can comprise an RS-232 interface, an RS-4125 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 1202.3 Ethernet interface such as described above. In some exemplary embodiments of the present disclosure, the control interface 1260 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the device 1200, including various exemplary methods and/or computer-readable media according to various exemplary embodiments of the present disclosure.

Figure 13:
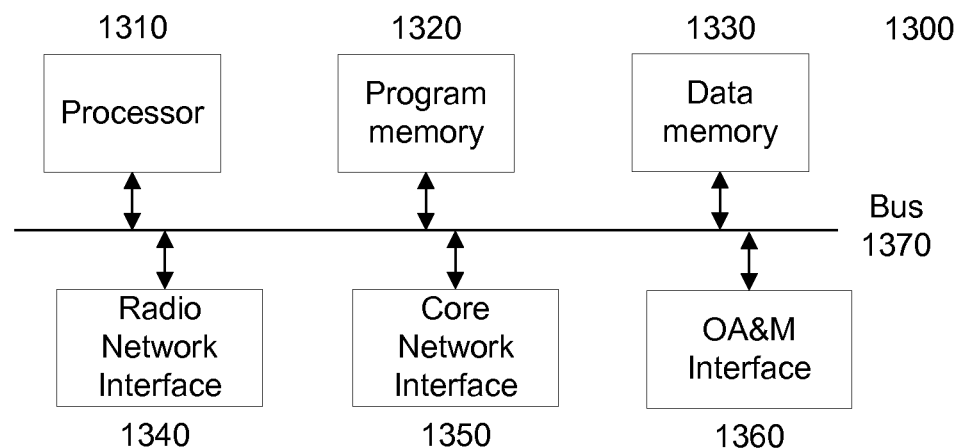
FIG. 13 is a block diagram of an exemplary network node according to various exemplary embodiments of the present disclosure.

FIG. 13 shows a block diagram of an exemplary network node 1300 according to various embodiments of the present disclosure. For example, exemplary network node 1300 can be configured by execution of instructions, stored on a computer-readable medium, to perform operations corresponding to one or more of the exemplary methods and/or procedures described above. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 comprises processor 1310 which is operably connected to program memory 1320 and data memory 1330 via bus 1370, which can comprise parallel address and data buses, serial ports, or other methods and/or structures known to those of ordinary skill in the art.

Program memory 1320 comprises software code (e.g., program instructions) executed by processor 1310 that can configure and/or facilitate network node 1300 to communicate with one or more other devices using protocols according to various embodiments of the present disclosure, including one or more exemplary methods and/or procedures discussed above. Program memory 1320 can also comprise software code executed by processor 1310 that can facilitate and specifically configure network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1340 and core network interface 1350. By way of example and without limitation, core network interface 1350 can comprise the S1 interface and radio network interface 1350 can comprise the Uu interface, as standardized by 3GPP. Program memory 1320 can further comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can comprise multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill in the art will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
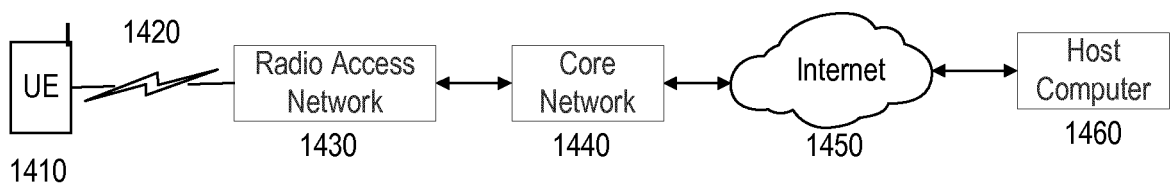
FIG. 14 is a block diagram of an exemplary network configured to provide over-the-top (OTT) data services between a host computer and a UE, according to various exemplary embodiments of the present disclosure.

FIG. 14 is a block diagram of an exemplary communication network configured to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE-A, and 5G/NR. For example, UE 1410 can be configured and/or arranged as shown in other figures discussed above. RAN 1430 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1350 described above. In some exemplary embodiments, RAN 1430 and core network 1440 can be configured and/or arranged as shown in other figures discussed above. For example, eNBs comprising an E-UTRAN 1430 can communicate with an EPC core network 1440 via an S1 interface, such as shown in FIG. 1. As another example, gNBs comprising a NR RAN 1430 can communicate with a 5GC core network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1430 operation in unlicensed spectrum, particularly to indicate, assign, and/or configure time resources for UEs—such as UE 1410—to transmit on an UL shared channel in unlicensed spectrum. For example, by assigning different transmission starting symbols within a timeslot, such techniques can reduce UL contention between UEs that are assigned the same UL timeslot resources. When used in NR UEs (e.g., UE 1410) and gNBs (e.g., gNBs comprising RAN 1430), exemplary embodiments described herein can provide various improvements, benefits, and/or advantages that facilitate the use of multiple types of data services having different performance requirements. For example, by flexibly configuring power control settings for UL transmissions according to the particular service associated with the UL transmission, exemplary embodiments facilitate the different services to meet their respective performance requirements. As a consequence, this improves the performance of these services as experienced by OTT service providers and end-users, including more consistent data throughout and lower latency without excessive UE power consumption or other reductions in user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for a user equipment (UE) to receive one or more physical downlink control channels (PDCCHs) from a radio access network (RAN) using a selectable number of available antennas and receive chains, the method comprising:
  receiving, from a RAN node, a PDCCH configuration;
  selecting a number of antennas and receive chains to be activated for receiving PDCCH from the RAN node, based on one or more of the following included in the PDCCH configuration:
    a search space comprising a plurality of PDCCH candidates;
    a format of downlink control information (DCI) messages transmitted on the PDCCH; and
    at least one slot offset between a PDCCH transmission and a subsequent transmission of a physical downlink shared channel (PDSCH); and
  receiving, from the RAN node, one or more PDCCHs using the selected number of antennas and receive chains.

2. The method of claim 1, wherein each PDCCH candidate is associated with at least one of the following: the format and a location in the search space.

3. The method of claim 1, wherein:
  selecting the number of antennas and receive chains includes:
    determining a first number of antennas and receive chains for PDCCH reception, wherein the first number comprises a minimum number of the available antennas and receive chains needed to meet one or more PDCCH performance metrics; and
    selecting one of the following to use for PDCCH reception: the first number of antennas and receive chains, and a second number of antennas and receive chains that is greater than the first number.

4. The method of claim 3, wherein the second number is a minimum number of the available antennas and receive chains that are required to correctly decode the subsequent PDSCH transmission.

5. The method of claim 3, wherein the second number is the number of the available antennas and receive chains.

6. The method of claim 3, wherein the first number is one.

7. The method of claim 3, wherein:
  selecting one of the first number and the second number of antennas and receive chains comprises determining whether the format of DCI messages can indicate at least one PDSCH transmission format that requires the second number of antennas and receive chains for correct decoding.

8. The method of claim 7, wherein the at least one PDSCH transmission format comprises at least one of the following:
  a multi-layer PDSCH transmission; and
  a PDSCH transmission that uses additional frequency-domain resources than the PDCCH.

9. The method of claim 3, wherein the at least one slot offset comprises a plurality of slot offsets, and selecting one of the first and second numbers of antennas and receive chains further comprises:
  based on determining that the format of the DCI messages can indicate the at least one PDSCH transmission format, determining whether a minimum slot offset, of the plurality of slot offsets, is less than a predetermined duration; and
  based on determining that the minimum slot offset is less than the predetermined duration, selecting the second number of antennas and receive chains.

10. The method of claim 9, wherein the predetermined duration is based on the time required to activate additional antennas and receive chains.

11. The method of claim 9, wherein selecting one of the first and second number of antennas and receive chains further comprises: based on determining that the minimum slot offset is greater than or equal to the predetermined duration, selecting the first number of antennas and receive chains.

12. The method of claim 9, wherein selecting one of the first and second number of antennas and receive chains further comprises, based on determining that the minimum slot offset is less than the predetermined duration:
  determining whether the minimum slot offset was used during a predetermined number of previously received PDSCH transmissions; and
  based on determining that the minimum slot offset was not used during the predetermined number, selecting the first number instead of the second number.

13. The method of claim 3, wherein selecting a first number of antennas and receive chains for PDCCH reception comprises:
  determining a link quality and a code rate associated with each PDCCH candidate;
  determining, for each PDCCH candidate based on the associated code rate, one or more performance metrics for each of a plurality of candidate numbers of antennas and receive chains; and
  selecting, as the first number, a minimum of the candidate numbers for which link qualities associated with all PDCCH candidates are greater than or equal to the corresponding one or more performance metrics.

14. The method of claim 13, wherein:
  each PDCCH candidate is associated with a respective minimum of the candidate numbers of antennas and receive chains; and
  selecting the first number further comprises selecting, as the first number, a maximum of the respective minima of the candidate numbers.

15. The method of claim 13, wherein the link quality associated with each PDCCH candidate is determined based on measurements made on one or more reference signals (RS) associated with one or more previous PDCCH transmissions.

16. The method of claim 13, wherein determining the link quality associated with each PDCCH candidate further comprises determining, for each PDCCH candidate, respective link qualities associated with the candidate numbers of antennas and receive chains.

17. The method of claim 16, wherein determining, for each PDCCH candidate, respective link qualities associated with the candidate numbers of antennas and receive chains comprises:
   determining a first link quality associated with a first candidate number based on the measurements made on the one or more RS using the first candidate number of antennas and receive chains; and
   determining further link qualities associated with other candidate numbers based on the first link quality and respective predetermined offset values.

18. The method of claim 13, wherein at least two of the plurality of PDCCH candidates are associated with different code rates.

19. The method of claim 1, further comprising sending a request for a PDCCH configuration that facilitates using a reduced number of antennas and receive chains for PDCCH reception, wherein the request identifies one or more of the following: a particular PDCCH configuration; a configuration of the search space; the format of the DCI messages; PDCCH frequency resources; an aggregation level; and the at least one slot offset between transmission of the PDCCH and the subsequent transmission of the PDSCH.

20. A method for a radio access network (RAN) node to configure a user equipment (UE) to receive a physical downlink control channel (PDCCH) using a selectable number of available antennas and receive chains, the method comprising:
   selecting a PDCCH configuration including the following parameters, wherein at least one of the following is selected to facilitate the UE using a reduced number of antennas and receive chains for PDCCH reception:
      a search space comprising a plurality of PDCCH candidates;
      a downlink control information (DCI) format; and
      at least one slot offset between PDCCH transmission and a subsequent transmission of a physical downlink shared channel (PDSCH);
   sending the PDCCH configuration to the UE; and
   subsequently transmitting, to the UE via the PDCCH, a DCI message scheduling a PDSCH transmission, to the UE, at a slot offset that was indicated in the configuration.

21. The method of claim 20, further comprising receiving, from the UE, a request for a PDCCH configuration that facilitates using a reduced number of antennas and receive chains for PDCCH reception, wherein:
   the request identifies one or more of the following: a particular PDCCH configuration, a search space configuration, a DCI format, PDCCH frequency resources, an aggregation level, and a slot offset between transmission of the PDCCH and a subsequent transmission of a PDSCH; and
   the PDCCH configuration is selected in response to the request.

22. A user equipment (UE) configured to receive a physical downlink control channel (PDCCH) from a radio access network (RAN) using a selectable number of available antennas and receive chains, the UE comprising:
   transceiver circuitry configured to communicate with a RAN node, the transceiver circuitry including the available antennas and receive chains; and
   processing circuitry operatively coupled to the transceiver circuitry, whereby the processing circuitry and the transceiver circuitry are configured to:
      receive, from the RAN node, a PDCCH configuration;
      select a number of antennas and receive chains to be activated for receiving PDCCH from the RAN node, based on one or more of the following included in the PDCCH configuration:
         a search space comprising a plurality of PDCCH candidates;
         a format of downlink control information (DCI) messages transmitted on the PDCCH; and
         at least one slot offset between a PDCCH transmission and a subsequent transmission of a physical downlink shared channel (PDSCH); and
      receive, from the RAN node, one or more PDCCHs using the selected number of antennas and receive chains.

23. A network node, in a radio access network (RAN), arranged to configure a user equipment (UE) to receive a physical downlink control channel (PDCCH) using a selectable number of available antennas and receive chains, the network node comprising:
   radio network interface circuitry configured to communicate with the UE; and
   processing circuitry operatively coupled the radio network interface circuitry, whereby the processing circuitry and the radio network interface circuitry are configured to perform operations corresponding to the method of claim 20.

24. A non-transitory, computer-readable medium storing computer-executable instructions that, when executed by at least one processor of a user equipment (UE), configure the UE to perform operations corresponding to the method of claim 1.

25. A non-transitory, computer-readable medium storing computer-executable instructions that, when executed by at least one processor of a network node, configure the network node to perform operations corresponding to the method of claim 20.

* * * * *